(12) United States Patent
Hayasaka et al.

(10) Patent No.: US 6,816,767 B2
(45) Date of Patent: Nov. 9, 2004

(54) VEHICLE COLLISION DECISION APPARATUS

(75) Inventors: Masatoshi Hayasaka, Shioya-gun (JP); Fang Yuan, Kawachi-gun (JP); Yukio Hiruta, Utsunomiya (JP); Tsutomu Fukui, Haga-gun (JP)

(73) Assignees: Keihin Corporation, Tokyo (JP); Honda Giken Kogyo Kabushiki Kaisha, Tokyo (JP)

(*) Notice: Subject to any disclaimer, the term of this patent is extended or adjusted under 35 U.S.C. 154(b) by 133 days.

(21) Appl. No.: 10/329,203

(22) Filed: Dec. 24, 2002

(65) Prior Publication Data

US 2003/0127271 A1 Jul. 10, 2003

(30) Foreign Application Priority Data

Dec. 26, 2001 (JP) .......................... 2001-394932

(51) Int. Cl.[7] .............................................. B60R 21/32
(52) U.S. Cl. ........................ 701/47; 701/46; 280/735; 180/271; 180/282
(58) Field of Search ............................ 701/45, 46, 47; 280/734, 735; 180/271, 282

(56) References Cited

U.S. PATENT DOCUMENTS

| | | | | |
|---|---|---|---|---|
| 5,071,160 A | * | 12/1991 | White et al. ................. 280/735 |
| 5,446,661 A | * | 8/1995 | Gioutsos et al. .............. 701/45 |
| 5,504,379 A | | 4/1996 | Mazur et al. |
| 5,787,377 A | * | 7/1998 | Watanabe et al. ............. 701/45 |
| 5,904,730 A | | 5/1999 | Yamazaki et al. |
| 5,936,518 A | | 8/1999 | Fukui et al. |
| 6,018,980 A | | 2/2000 | Kimura et al. |
| 6,169,945 B1 | * | 1/2001 | Bachmaier .................. 701/45 |
| 6,272,411 B1 | * | 8/2001 | Corrado et al. .............. 701/45 |
| 2001/0038202 A1 | | 11/2001 | Robaru et al. |

FOREIGN PATENT DOCUMENTS

JP          4-252758          5/1999

OTHER PUBLICATIONS

Watanabe et al. Advanced Passive Safety System Via Prediction and Sensor Fusion, 1994 Vehicle Navigation & Information System Conference Proceedings pp. 435–440.

* cited by examiner

Primary Examiner—Gary Chin
(74) Attorney, Agent, or Firm—Carrier, Blackman & Associates, P.C.; William D. Blackman; Joseph P. Carrier

(57) ABSTRACT

A vehicle collision decision apparatus determines whether or not an occupant-protecting apparatus should be started in a collision by an occupant moving characteristics determining device. Also, whether or not the collision continues is determined in an acceleration change determining section. A determining threshold for a frequency component which indicates damage to the vehicle which is calculated in a frequency component calculating device is selected. The occupant-protecting apparatus is activated appropriately by monitoring the damage to the vehicle in the frequency component determining device by using the frequency component. By doing this, a vehicle collision decision apparatus which can determine the condition in the vehicle collision appropriately is provided.

12 Claims, 12 Drawing Sheets

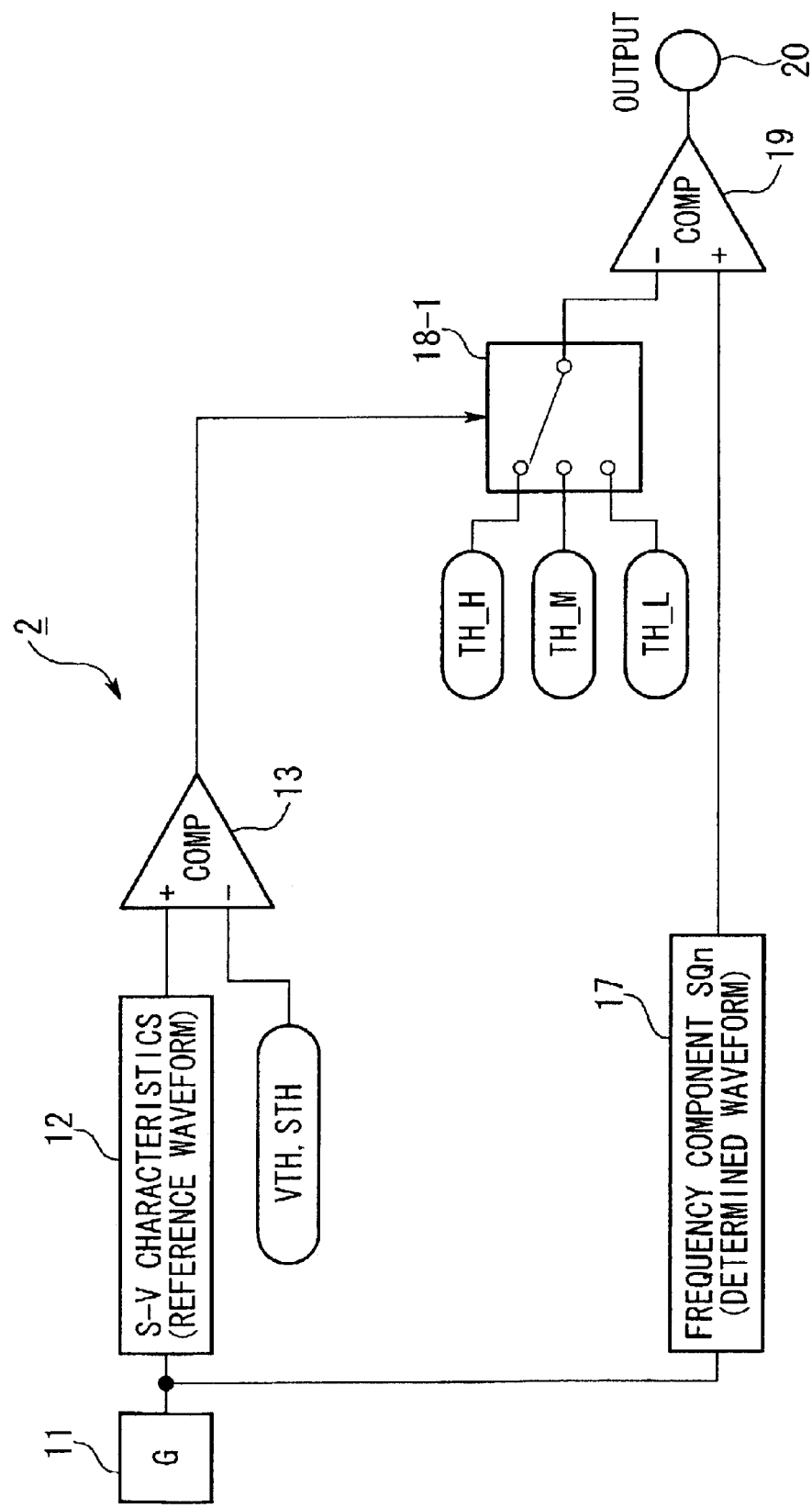

VEHICLE COLLISION DECISION APPARATUS

FIELD OF THE INVENTION

The present invention relates to a vehicle collision decision apparatus for operating an occupant-protecting device such as an air bag apparatus or a seat belt pre-tensioning device by detecting a collision of a vehicle.

DESCRIPTION OF THE RELATED ART

Conventionally, a vehicle collision decision apparatus is known which is provided with, for example, an acceleration sensor for measuring an acceleration (or deceleration) which is applied to a vehicle so as to detect changes in the acceleration of the vehicle by using an acceleration signal which is output from an acceleration sensor and activates an occupant-protecting apparatus such as an air bag apparatus or a seat belt pre-tensioner under conditions that a primary integration or a secondary integration of the acceleration signal over time is performed and these integrated values exceed a predetermined threshold.

In the case in which it is determined by such a vehicle collision decision apparatus that there has been a collision, for example, when there is a vehicle collision, an air bag apparatus protects occupants in the vehicle by activating an ignition device so as to deploy the air bag between a vehicle interior and the occupants. Thus, the occupants in the vehicle are securely protected from a secondary collision. Therefore, it is necessary to determine the occurrence of the vehicle collision so as to reliably protect the occupants in the vehicle by deploying the air bag appropriately.

It is preferable that an air bag apparatus be able to determine whether or not the air bag is deployed according to the degree of impact in the secondary collision for the occupant in the vehicle with the vehicle interior. However, in a conventional vehicle collision decision apparatus, an occupant-protecting apparatus such as an air bag apparatus starts operation depending on behavioral characteristics of the vehicle in which a calculated value which is calculated from the measured acceleration signal by using a predetermined method exceeds a predetermined threshold regardless of factors such as deceleration of the vehicle and positions of the occupants in the vehicle when there is a collision. In such a case, there was a problem in which the air bag cannot be deployed appropriately because the occupant-protecting apparatus cannot follow the changes in the vehicle chassis caused by the collision and the occupant's position; therefore, it was not possible to determine whether or not the air bag or the like should be deployed.

SUMMARY OF THE INVENTION

The present invention was made in consideration of the above problems. An object of the present invention is to provide a vehicle collision decision apparatus which can decide the condition of collision quickly by monitoring the moving characteristics of the occupants in the car and collapse of the vehicle chassis.

In order to solve the problems mentioned above, in a first aspect of the present invention, a vehicle collision decision apparatus comprises an acceleration measuring device which measures an acceleration of a vehicle and generates an acceleration signal, an occupant movement characteristics calculating device which calculates occupant movement characteristics according to an acceleration signal from the acceleration measuring device, an occupant movement characteristics determining device which decides whether or not the occupant movement characteristics exceed a predetermined movement characteristics determining threshold, a frequency analyzing device which decomposes waveforms of the acceleration signal into frequency components, a frequency component determining threshold setting device which sets a predetermined frequency component determining threshold for the frequency components according to results by the occupant movement characteristics determining device, a frequency component determining device which determines whether or not the frequency components exceed the frequency component determining threshold, and a control signal generating device which generates a control signal for controlling an occupant-protecting apparatus according to results from the frequency component determining device.

In the vehicle collision decision apparatus having the above structures, it is possible to analyze and determine whether or not the occupant-protecting apparatus should be activated in a collision by monitoring moving characteristics of the occupants which is calculated by the occupant moving characteristics calculating device and the damage to the vehicle chassis according to a frequency component for the acceleration by the frequency component determining device.

In a second aspect of the present invention, a vehicle collision decision apparatus comprises, an acceleration measuring device which measures an acceleration of a vehicle and generates an acceleration signal, an occupant movement characteristics calculating device which calculates occupant movement characteristics according to an acceleration signal from the acceleration measuring device, an occupant movement characteristics determining device which determines whether or not the occupant movement characteristics exceed a predetermined movement characteristics determining threshold, an acceleration change calculating device which calculates changes in the acceleration signal, an acceleration change determining device which determines whether or not the changes in the acceleration signal exceed a predetermined acceleration determining threshold, and a control signal generating device which generates a control signal for controlling an occupant-protecting apparatus according to results determined by the occupant movement characteristics determining device and the acceleration change determining device.

In the vehicle collision decision apparatus having the above structures, it is possible to analyze and determine whether or not the occupant-protecting apparatus should be activated in a collision by monitoring moving characteristics of the occupants which are calculated by the occupant moving characteristics calculating device and determining whether or not the collision continues according to the acceleration which is determined by the acceleration change determining device.

In a third aspect of the present invention, a vehicle collision decision apparatus comprises an acceleration measuring device which measures an acceleration of a vehicle and generates an acceleration signal, an occupant movement characteristics calculating device which calculates occupant movement characteristics according to an acceleration signal from the acceleration measuring device, an occupant movement characteristics determining device which determines whether or not the occupant movement characteristics exceed a predetermined movement characteristics determining threshold, an acceleration change calculating device which calculates changes in the acceleration signal, an acceleration change determining device which determines whether or not the changes in the acceleration signal exceed the predetermined acceleration determining threshold, a frequency component analyzing device which decomposes a waveform of the acceleration signal into a frequency component, a frequency component determining threshold setting device which sets a predetermined frequency component determining threshold for the frequency component according to results by the occupant movement characteristics determining device and the acceleration change determining device, a frequency component determining device which determines whether or not the frequency component exceeds the frequency component determining threshold, and a control signal generating device which generates a control signal for controlling an occupant-protecting apparatus according to results determined by the frequency component determining device.

In the vehicle collision decision apparatus having tile above structures, it is possible to analyze and determine whether or not the occupant-protecting apparatus should be activated in a collision by monitoring moving characteristics of the occupants which are calculated by the occupant moving characteristics calculating device and determining whether or not the collision continues according to the acceleration which is determined by the acceleration change determining device, and furthermore determining by the frequency component determining device according to the frequency component whether or not the chassis of the vehicle has broken.

In a fourth aspect of the present invention, in a vehicle collision decision apparatus, the occupant movement characteristics calculating device calculates a moving speed and a moving amount of the occupant, and the occupant movement characteristics determining device determines whether or not the moving speed of the occupant exceeds a predetermined moving speed determining threshold and the moving amount of the occupant exceeds a predetermined moving amount determining threshold.

In the vehicle collision decision apparatus having the above structures, it is possible to combine results of the moving speed and the moving distance of the occupant in the vehicle with the determining threshold by calculating and determining the moving speed and the moving distance of the occupant in the vehicle so as to determine whether or not the occupant protecting device should be activated in the vehicle collision.

In a fifth aspect of the present invention, a vehicle collision decision method comprises: an acceleration measuring step for measuring an acceleration of a vehicle and generating an acceleration signal, an occupant movement characteristics calculating step for calculating an occupant movement characteristics according to an acceleration signal from the acceleration measuring device, an occupant movement characteristics determining step for determining whether or not the occupant movement characteristics exceed a predetermined movement characteristics determining threshold, a frequency analyzing step for decomposing waveforms of the acceleration signal into frequency components, a frequency component determining threshold setting step for setting a predetermined frequency component determining threshold for a frequency component according to results obtained in the occupant movement characteristics determining step, a frequency component determining step for determining whether or not the frequency components exceed the frequency component determining threshold, and a control signal generating step for generating a control signal for controlling an occupant-protecting apparatus according to results obtained in the frequency component determining step.

In the vehicle collision decision method having the steps above, the same effect as that obtained in the first aspect can be realized.

In a sixth aspect of the present invention, a vehicle collision decision method comprises: an acceleration measuring step for measuring an acceleration of a vehicle and generating an acceleration signal, an occupant movement characteristics calculating step for calculating occupant movement characteristics according to an acceleration signal from the acceleration measuring step, an occupant movement characteristics determining step for determining whether or not the occupant movement characteristics exceed a predetermined movement characteristics determining threshold, an acceleration change calculating step for calculating changes in the acceleration signal, an acceleration change determining step for determining whether or not the changes in the acceleration signal exceed a predetermined acceleration determining threshold, a control signal generating step for generating a control signal for controlling an occupant-protecting apparatus according to results determined in the occupant movement characteristics determining step and the acceleration change determining step.

In the vehicle collision decision method having the steps above, the same effects as those obtained in the second aspect can be realized.

In a seventh aspect of the present invention, a vehicle collision decision method comprises: an acceleration measuring step for measuring an acceleration of a vehicle and generating an acceleration signal, an occupant movement characteristics calculating step for calculating occupant movement characteristics according to an acceleration signal from the acceleration measuring step, an occupant movement characteristics determining step for determining whether or not the occupant movement characteristics exceed a predetermined movement characteristics determining threshold, an acceleration change calculating step for calculating changes in the acceleration signal, an acceleration change determining step for determining whether or not the changes in the acceleration signal exceed a predetermined acceleration determining threshold, a frequency component analyzing step for decomposing a waveform of the acceleration signal into a frequency component, a frequency component determining threshold setting step for setting a predetermined frequency component determining threshold for the frequency component according to results obtained in the occupant movement characteristics determining step and the acceleration change determining step, a frequency component determining step for determining whether or not the frequency component exceeds the frequency component determining threshold, and a control signal generating step for generating a control signal for controlling an occupant-protecting apparatus according to results determined in the frequency component determining step.

In the vehicle collision decision method having the steps above, the same effects as those obtained in the third aspect can be realized.

In an eighth aspect of the present invention, in a vehicle collision decision method, a moving speed and a moving amount of the occupant are calculated in the occupant movement characteristics calculating step, and whether or not the moving speed of the occupant exceeds a predetermined moving speed determining threshold and whether or not the moving amount of the occupant exceeds a predetermined moving amount determining threshold are determined in the occupant movement characteristics determining step.

In the vehicle collision decision method having the steps above, the same effects as those obtained in the fourth aspect can be realized.

As explained above, by the vehicle collision decision apparatus according to the first aspect of the present invention, it is possible to determine according to the moving characteristics of the occupant which is calculated in the occupant moving characteristics calculating device whether of not the occupant protecting device should be activated in a vehicle collision.

Therefore, there is an effect in that it is possible to activate an occupant protecting device such as an air bag device by an easy structure appropriately according to the moving characteristics (moving distance and moving speed) of the occupant.

By the vehicle collision decision apparatus according to the second aspect of the present invention having the above structures, it is possible to analyze and determine whether or not the occupant-protecting apparatus should be activated in a collision by monitoring moving characteristics of the occupants which are calculated by the occupant moving characteristics calculating device and, furthermore, determining by the frequency component determining device according to the frequency component whether or not the chassis of the vehicle is broken.

Therefore, there is an effect in that it is possible to start an occupant protecting device such as an air bag device by an easy structure appropriately according to the moving characteristics (moving distance and moving speed) of the occupant and degree of destruction of the vehicle.

By the vehicle collision determining apparatus according to the third aspect of the present invention having the above structures, it is possible to analyze and determine whether or riot the occupant-protecting apparatus should be activated in a collision by monitoring moving characteristics of the occupants which are calculated by the occupant moving characteristics calculating device and determining whether or not the collision continues according to the acceleration which is determined by the acceleration change determining device.

Therefore, there is an effect in that it is possible to activate an occupant protecting device such as an air bag device by an easy structure appropriately according to the moving characteristics (moving distance and moving speed) of the occupant and change in the acceleration in the vehicle.

By the vehicle collision decision apparatus according to the fourth aspect of the present invention having the above structures, it is possible to analyze and determine whether or not the occupant-protecting apparatus should be activated in a collision by monitoring moving characteristics of the occupants which are calculated by the occupant moving characteristics calculating device and determining whether or not the collision continues according to the acceleration which is determined by the acceleration change determining device and, furthermore, determining by the frequency component determining device according to the frequency component whether or not the chassis of the vehicle is broken.

Therefore, there is an effect in that it is possible to activate an occupant protecting device such as an air bag device by an easy structure appropriately according to the moving characteristics (moving distance and moving speed) of the occupant and the change of acceleration in the vehicle.

By the vehicle collision decision apparatus according to another aspect of the present invention, it is possible to combine the result in the moving speed and the moving distance of the occupant in the vehicle with the determining threshold by calculating and determining the moving speed and the moving distance of the occupant in the vehicle so as to determine whether or not the occupant protecting device should be activated in the vehicle collision.

Therefore, there is an effect in that it is possible to start an occupant-protecting device such an air bag device appropriately according to vehicle collisions which occur under various conditions.

By the vehicle collision decision method according to the fifth aspect of the present invention, the same effects as those obtained in the first aspect can be realized.

By the vehicle collision decision method according to the sixth aspect of the present invention, the same effects as those obtained in the second aspect can be realized.

By the vehicle collision decision method according to the seventh aspect of the present invention, the same effects as those obtained in the third aspect can be realized.

By the vehicle collision decision method according to the eighth aspect of the present invention, the same effects as those obtained in the fourth aspect can be realized.

BRIEF DESCRIPTION OF THE DRAWINGS

FIG. 5 is a general diagram of a vehicle collision decision apparatus according to a second embodiment of the present invention.

DETAILED DESCRIPTION OF THE INVENTION

Embodiments of the present invention are explained with reference to drawings as follows.

First Embodiment

Figure 1:
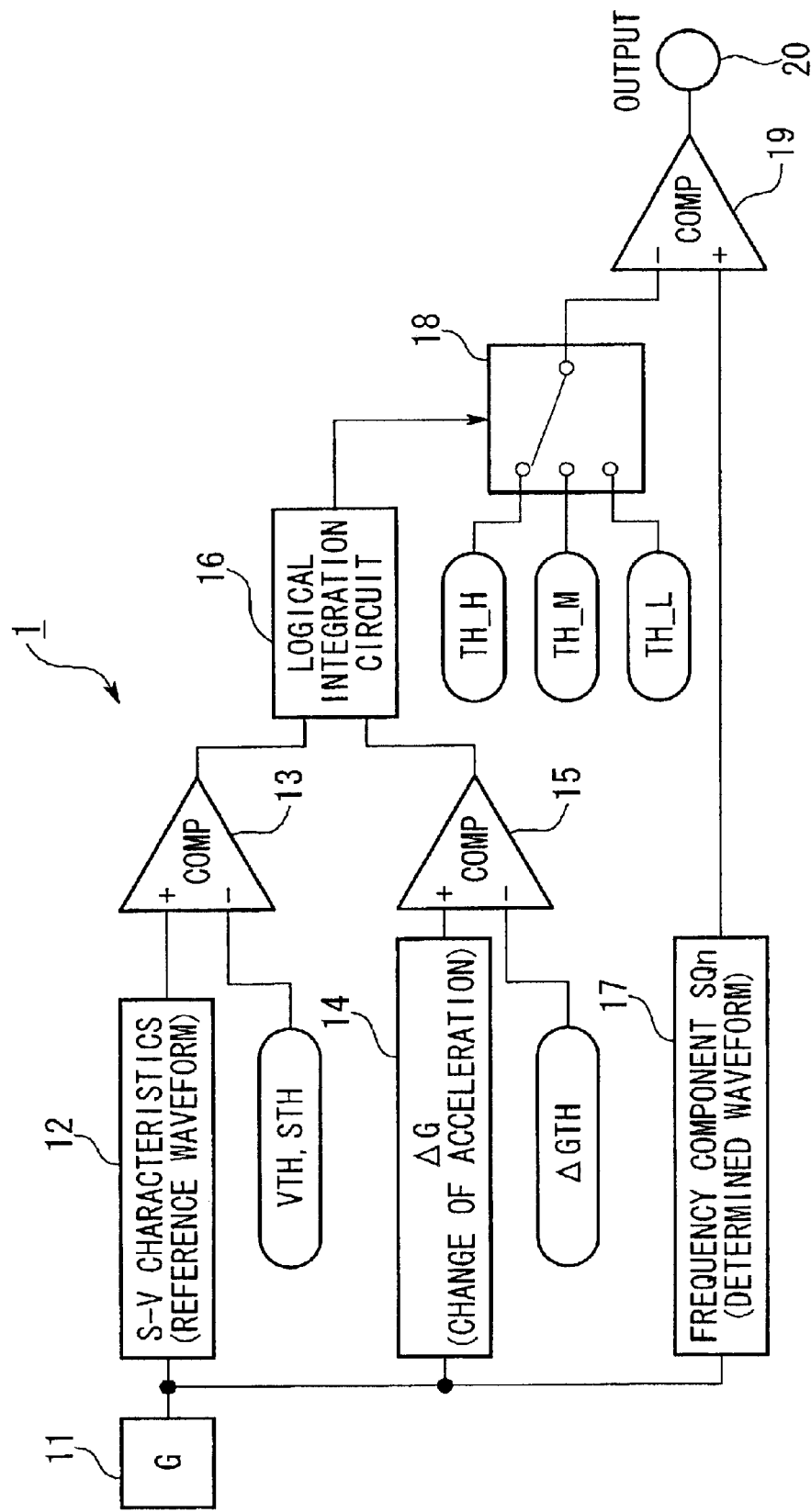
FIG. 1 is a general diagram of a vehicle collision decision apparatus according to a first embodiment of the present invention.

FIG. 1 is a general diagram of a vehicle collision decision apparatus according to a first embodiment in the present invention.

As shown in FIG. 1, a vehicle collision decision apparatus 1 according to the first embodiment comprises an acceleration sensor 11 for measuring the acceleration which acts on the vehicle, an occupant moving characteristics calculating device 12 for calculating the moving characteristics (S-V characteristics) of the occupant according to the acceleration signal which is generated in the acceleration sensor 11, an occupant moving characteristics determining device 13 for determining whether or not the moving characteristics of the occupant exceed a moving characteristics determining threshold (which is explained in detail later), an acceleration change calculating device 14 for calculating the changing amount of the acceleration signal which is generated in the acceleration sensor 11, and an acceleration change determining section or device 15 which determines whether or not the change of the acceleration exceeds the acceleration determining threshold.

Also, a vehicle collision decision apparatus 1 according to the first embodiment comprises a frequency component calculating device 17 for decomposing waveforms of the acceleration signal which were generated by the acceleration sensor 11 into the frequency components, a logic integrating circuit 16 for integrating a logic in a result which is determined by the occupant moving characteristics determining device 13 and a logical result which is determined by the acceleration change determining device 15, a frequency component determining threshold switching device 18 for setting a frequency component determining threshold for the frequency component according to a result, emitted from the logic integrating circuit 16, which is determined by the occupant moving characteristics determining device 13 and the acceleration change determining device 15, a frequency component determining device 19 for determining whether or not the frequency component exceeds the frequency component determining threshold, and a start signal generating device 20 for generating a control signal which controls the occupant protecting device according to a result which is determined in the frequency component determining device 19.

Here, the acceleration sensor 11 outputs an acceleration signal G having a voltage which corresponds to the acceleration (or the deceleration) which acts on the vehicle in a longitudinal direction in the vehicle or in a latitudinal direction in the vehicle.

Also, the occupant moving characteristics calculating device 12 calculates a moving speed change $\Delta Vn$ as a moving characteristic for the occupant in a predetermined time interval (for example, $0 \leq t \leq n$) in the vehicle by performing a primary integration of the acceleration signal G which is put out from the acceleration sensor 11 timewise as shown in a formula F1 as follows. Also, it is possible to calculate the change in the vehicle speed such as accumulation of change in the vehicle speed over an infinite range (that is, $023\ t \leq \infty$) under conditions in which n is infinite.

$$\Delta Vn(t) = \int^{-n} G(t)dt \quad \text{F1}$$

Next, the occupant moving characteristics calculating device 12 calculates a moving amount $\Delta Vx$ for the occupant in the vehicle in the predetermined time interval (for example, $0 \leq t \leq x$) by performing a secondary integration of the acceleration signal G timewise as shown in a formula F2 as follows.

$$\Delta Sx(t) = \int^{-X} \int^{-X} G(t)dt^2 \quad \text{F2}$$

In the occupant moving characteristics determining device 13, whether or not the moving speed change $\Box Vn$ and the moving amount $\Delta Vx$ for the occupant which are calculated in the occupant moving characteristics calculating device 12 exceed a moving speed determining threshold VTH and a moving amount determining threshold STH (both VTH and STH are moving characteristics determining thresholds). Consequently, a command signal which is based on the result is put out to the logic integrating circuit 16.

Also, as shown in a formula F3 as follows, the acceleration change calculating device 14 calculates integration of the acceleration signal G in a predetermined time interval n based on the acceleration signal G which is put out from the acceleration sensor 11. Consequently, a timewise change for the integration, that is, a difference $\Box G$ in the integrations in the same time intervals such as $0<t<n$ and $n<t<2n$ is determined. Here, the difference $\Delta G$ indicates different conditions according to the vehicle speed in the collision.

$$\Delta G(t) = \int^{-n} G(t)dt - \int_{-n}^{-2n} G(t)dt \quad \text{F3}$$

The acceleration change determining device 15 determines whether or not the difference $\Delta G$ which is calculated in the acceleration change calculating device 14 is larger than the acceleration determining threshold $\Delta GTH$ so as to put out a command signal which is based on the result to the logic integrating circuit 16.

The logic integrating circuit 16 integrates a logical result in the occupant moving characteristics determining device 13 and a logical result in the acceleration change determining section or device 15 so as to output the integrated value as a switching signal for the determining threshold to the frequency component determining threshold switching device 18.

The frequency component calculating device 17 eliminates noise such as a high frequency component from the acceleration signal G which is output from the acceleration sensor 11. Furthermore, the frequency component calculating device 17 extracts a partial acceleration signal Gj (j is an integer) from the acceleration signal G which is obtained chronically by using an appropriate window function having, for example, a rectangular window having a predetermined time width. Hadamard transformation is performed on a waveform of the extracted partial acceleration signal Gj so as to decompose the waveform into frequency components SQ1 to SQn for each of the frequencies f1 to fn (n is an integer). Here, a decomposing method for the frequency component is not limited. Orthogonal transformation which is other than the Hadamard transformation such as Fourier transformation (high-speed Fourier transformation) and discrete cosine transformation are acceptable. In other words, any methods in which a waveform component of a constant frequency is calculated can be acceptable.

The frequency component determining threshold switching device 18 selects any one of, for example, a high-level threshold TH_H and a middle-level threshold TH_M and a low-level threshold TH_L according to the result determined by the logic integrating circuit 16 from outputs of the occupant moving characteristics determining device 13 and the acceleration change determining section 15 so as to be output to the frequency component determining device 19 as a frequency component determining threshold (level threshold) for a level value for the frequency component determined by the frequency component calculating device 17. Here, the details for the selecting condition for determining the threshold are explained later.

The frequency component determining device 19 determines, for example, whether or not the level values in each frequency component in the frequency components SQ1 to SQn which are calculated in the frequency component calculating device 17 are larger than the level value which is selected by the frequency component determining threshold switching device 18 so as to output the result to the start signal generating device 20.

The start signal generating device 20 outputs, for example, a command signal for starting the occupant protecting device such as an air bag device and a seat belt pre-tension device (none of which are shown in the drawing) according to the result in the frequency component determining device 19.

Figure 2:
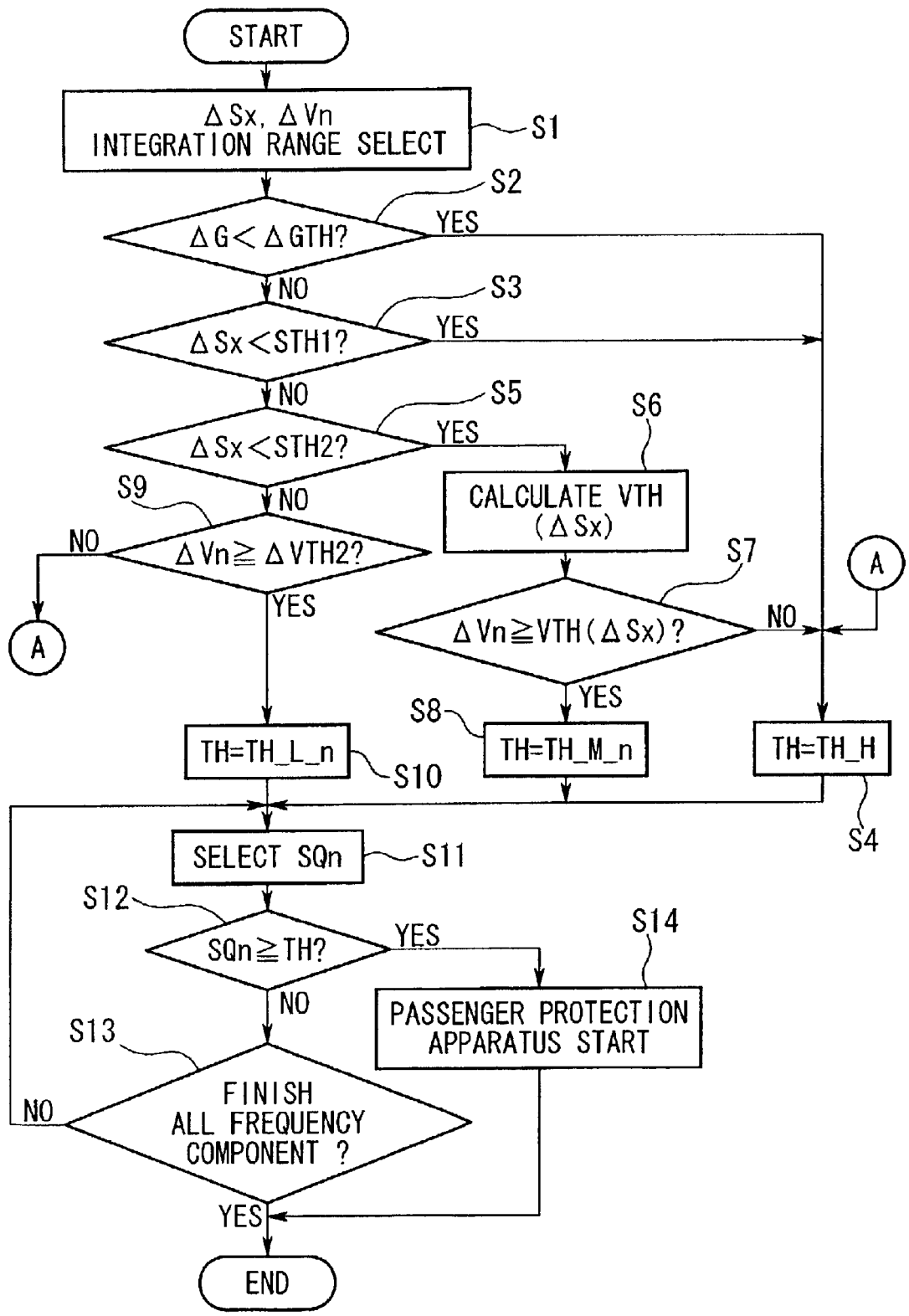
FIG. 2 is a flow chart showing operations which are performed by the vehicle collision decision apparatus according to the first embodiment of the present invention.

Next, operations for the vehicle collision decision apparatus 1 in the present embodiment are explained with reference to the drawings. FIG. 2 is a flow chart showing operations which are performed by the vehicle collision decision apparatus 1 according to the first embodiment in the present invention.

First, an occupant moving characteristics calculating device 12 selects integration sections for the moving amount □Sx for the occupant and the moving speed ΔVn so as to designate a map for S-V characteristics as a reference waveform (step S1). Here, the integration sections can be selected individually for the moving amount ΔSx for the occupant and the moving speed ΔVn among, for example, sections 1 to 24 (ms).

Figure 3A:
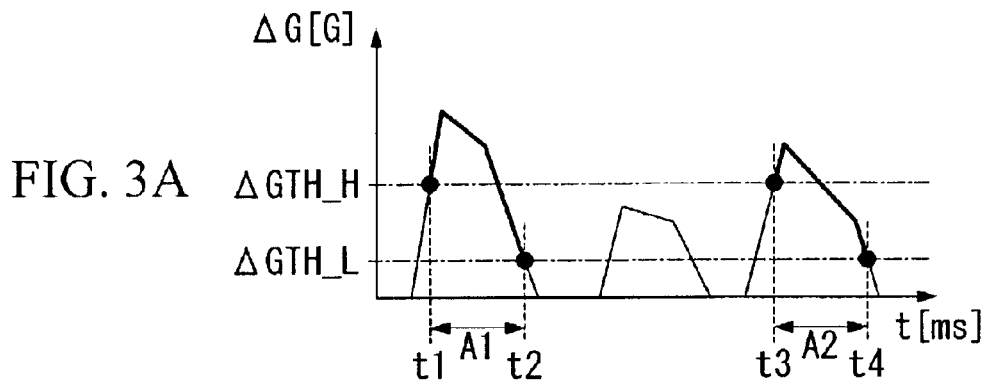
FIGS. 3A to 3C are graphs showing operations which are performed by the vehicle collision decision apparatus according to the first embodiment of the present invention.

After the occupant moving characteristics calculating device 12 designates the map for the S-V characteristics, the acceleration change determining device 15 determines whether or not the change in the calculated acceleration in the acceleration change calculating device 14 is smaller than the acceleration determining threshold ΔGTH (step S2). Here, the acceleration determining threshold ΔGTH has hysteresis for maintaining the threshold. As shown in FIG. 3A, the acceleration determining threshold ΔGTH determines the change in acceleration by using the high threshold ΔGTH_H and the low threshold ΔGTH_L. In FIG. 3A, a condition in the step S2 is satisfied in a section A1 in the time interval t1 to t2 and a section A2 in the time interval t3 to t4 (the change in acceleration exceeds the acceleration determining threshold ΔGTH).

In the step S2, in the case in which the change in acceleration exceeds the acceleration determining threshold ΔGTH (NO in the step S2), the occupant moving characteristics determining device 13 determines whether or not the moving amount ΔSx for the occupant is smaller than a first moving amount determining threshold STH1 (step S3).

In the case in which the change in acceleration is smaller than the acceleration determining threshold ΔGTH (YES in the step S2) in the step S2, and in the case in which the moving amount ΔSx for the occupant is smaller than the first moving amount determining threshold STH1 in the step S3 (YES in the step S3), the frequency component determining threshold switching device 18 selects the high-level threshold TH_H as a frequency component determining threshold (level threshold) for the level value of the frequency component which is obtained in the frequency component calculating device 17 so as to output to the frequency component determining device 19 (step S4).

On the other hand, in the case in which the moving amount ΔSx for the occupant is larger than the first moving amount determining threshold STH1 in the step S3 (NO in the step S3), the occupant moving characteristics determining device 13 determines whether or not the moving amount ΔSx for the occupant is smaller than a second moving amount determining threshold STH2 (step S5).

In the step S5, in the case in which the moving amount ΔSx for the occupant is smaller than the second moving amount determining threshold STH2 (YES in the step S5), the occupant moving characteristics determining device 13 calculates the VTH (ΔSx) (step S6).

Figure 3B:
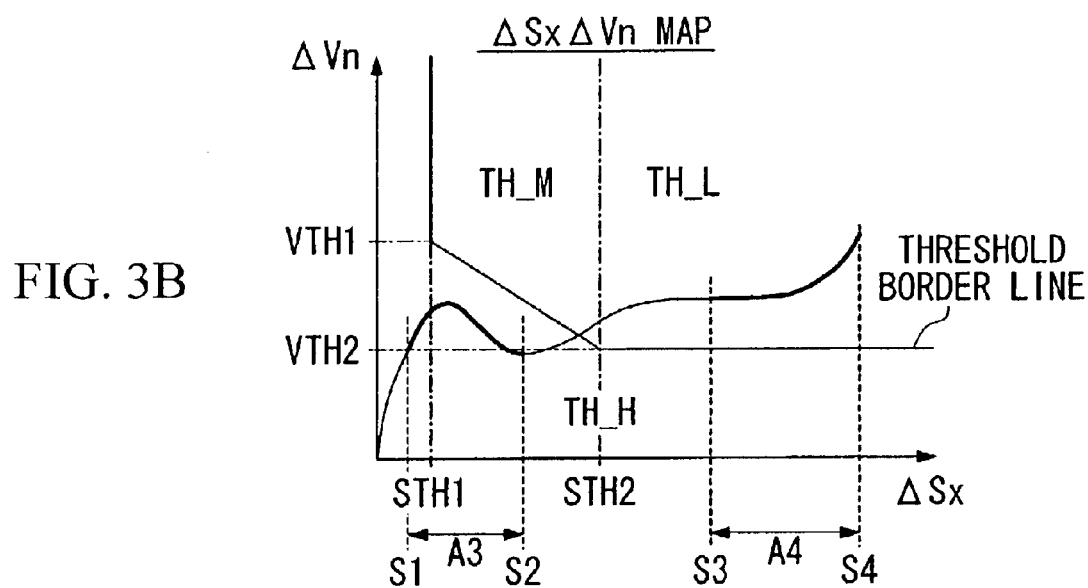
Figure 3C:
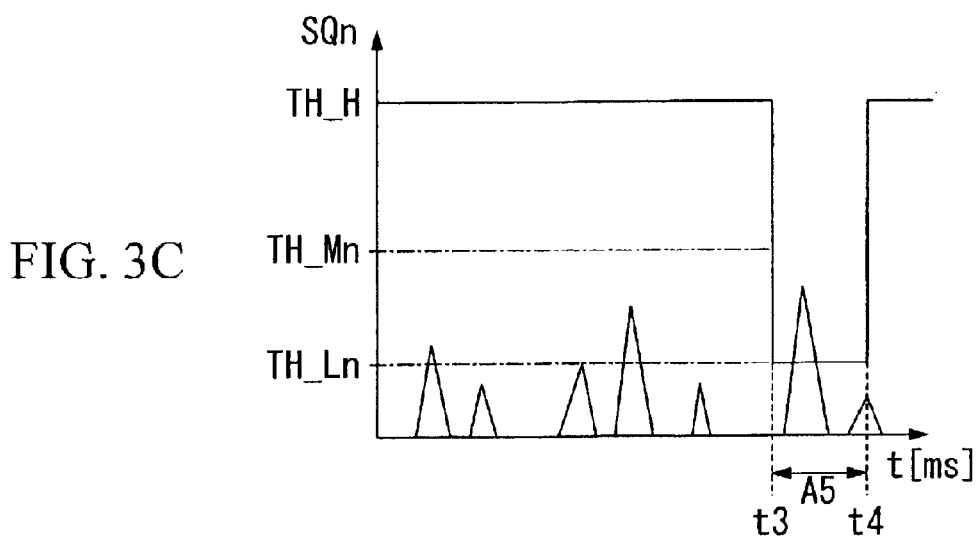

Here, the VTH (ΔSx) indicates a determining threshold in a part (section) which is determined by the first moving amount determining threshold STH1 and the second moving amount determining threshold STH2 for the moving amount of the occupant and the first and the second determining thresholds VTH1 and VTH2 at a threshold boarderline which is determined by the moving amount determining threshold STH and the moving speed determining threshold VTH as shown in FIG. 3B. For a method for calculating the determining threshold VTH (ΔSx), for example, a method in which the threshold is determined according to a similar figure in a triangle having vertexes such as (STH1, VTH1), (STH1, VTH2), and (STH1, VTH1), or a method in which the threshold is determined by using a function according to information such as inclination of a line which passes through two points such as (STH1, VTH1) and (STH2, VTH2) and its passing points can be acceptable.

After the determining threshold VTH (ΔSx) is determined, next, the occupant moving characteristics determining device 13 determines whether or not the moving speed ΔVn for the occupant is greater than or equal to the determining threshold VTH (ΔSx) (step S7).

In the case in which the moving speed ΔVn for the occupant is smaller than the determining threshold VTH (ΔSx) in the step S7 (NO in the step S7), the frequency component determining threshold switching device 18 selects the high-level threshold TH_H as a frequency component determining threshold (level threshold) according to the level value for the frequency component which is determined in the frequency component calculating device 17 so as to be output to the frequency component determining device 19 (step S4).

Also, in the case in which the moving speed ΔVn for the occupant is larger than or equal to the determining threshold VTH (ΔSx) in the step S7 (YES in the step S7), the frequency component determining threshold switching device 18 selects the middle-level threshold TH_M as a frequency component determining threshold (level threshold) according to the level value for the frequency component which is determined in the frequency component calculating device 17 so as to be output to the frequency component determining device 19 (step S8). Here, for the middle-level threshold TH_M, n determining thresholds which correspond to each frequency component are set.

On the other hand, in the case in which the moving amount ΔSx of the occupant is greater than the second moving amount determining threshold STH2 in the step S5 (NO in the step S5), the occupant moving characteristics determining device 13 determines whether or not the moving speed ΔVn of the occupant is less than the second moving speed determining threshold VTH2 (step S9).

In the case in which the moving speed ΔVn of the occupant is less than the second moving speed determining threshold VTH2 in the step S9 (NO in the step S9), the frequency component determining threshold switching device 18 selects the high-level threshold TH_H as a frequency component determining threshold (level threshold) for the level value of the frequency component which is determined in the frequency component calculating device 17 so as to output to the frequency component determining device 19 (step S4).

Also, in the case in which the moving speed ΔVn for the occupant is not less than the second moving speed determining threshold VTH2 in the step S9 (YES in the step S9), the frequency component determining threshold switching device 18 selects the low-level threshold TH_L as a frequency component determining threshold (level threshold) for the level value of the frequency component which is determined in the frequency component calculating device 17 so as to be output to the frequency component determining device 19 (step S10). Here, for the low-level threshold TH_L, n determining thresholds which correspond to each frequency component are set.

As explained above, after the frequency component determining threshold (level threshold) for the level value of the frequency component which is used in the frequency component determining device 19 is set, next, the frequency component determining device 19 selects the frequency component SQn (step S11) so as to determine whether or not the frequency component SQn is less than the frequency component determining threshold (level threshold) (step S12).

In the case in which the frequency component SQn is not less than the frequency component determining threshold (level threshold) in the step S12 (YES in the step S12), the start signal generating device 20 outputs a starting signal for the occupant-protecting apparatus (step S14) and completes the collision decision operation.

Also, in the case in which the frequency component SQn is less than the frequency component determining threshold (level threshold) in the step S12 (NO in the step S12), whether or not all the frequency components were determined is determined (step S13). In the case in which all the frequency components have not yet been determined (NO in the step S13), the above-explained operation is repeated from the step S11.

On the other hand, when all the frequency components were determined in the step S13 (YES in the step 313), the collision determining operation is completed.

Next, an example of the operation in the vehicle collision decision apparatus 1 according to the present embodiment is explained with reference to drawings. As shown in FIG. 3A, it may be understood that an area A1 in the time intervals t1 to t2 and an area A2 in the time intervals t3 to t4 are indicative of a collision because the change in acceleration is large. On the other hand, as shown in FIG. 3B, from the points of view of an occupant's moving speed and moving amount, an area A3 in the moving amounts S1 to S2 and an area A4 in the moving amounts S3 to S4 correspond to cases in which the change in acceleration is large. Thus, it is possible to understand that the area A4 in the moving amount S3 to 54 in which the change in moving amount for the occupant is large is dangerous. Therefore, the frequency component determining threshold (level threshold) which corresponds to the level value of the frequency component which indicates the destruction of the vehicle is set at the low-level threshold TH_L in an area A5 in the time intervals t3 to t4 which correspond to the area A2 in which the change in acceleration is large so as to put out the starting signal for the occupant-protecting apparatus.

Figure 4A:
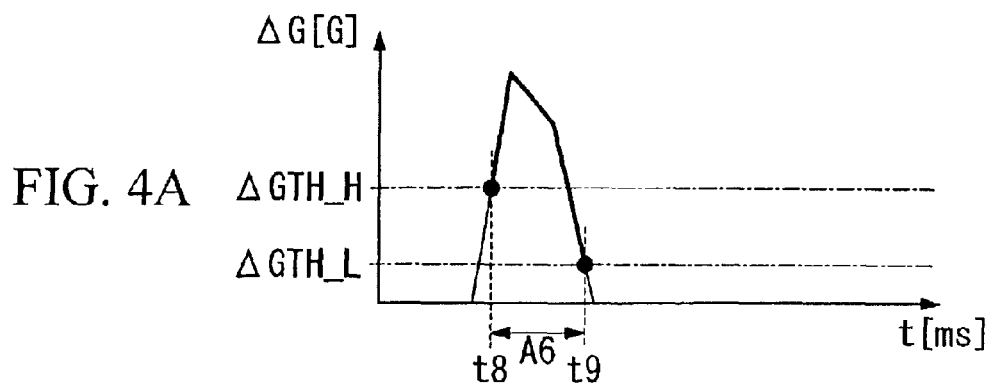
FIGS. 4A to 4C are graphs showing operations which are performed by the vehicle collision decision apparatus according to the first embodiment of the present invention.
Figure 4B:
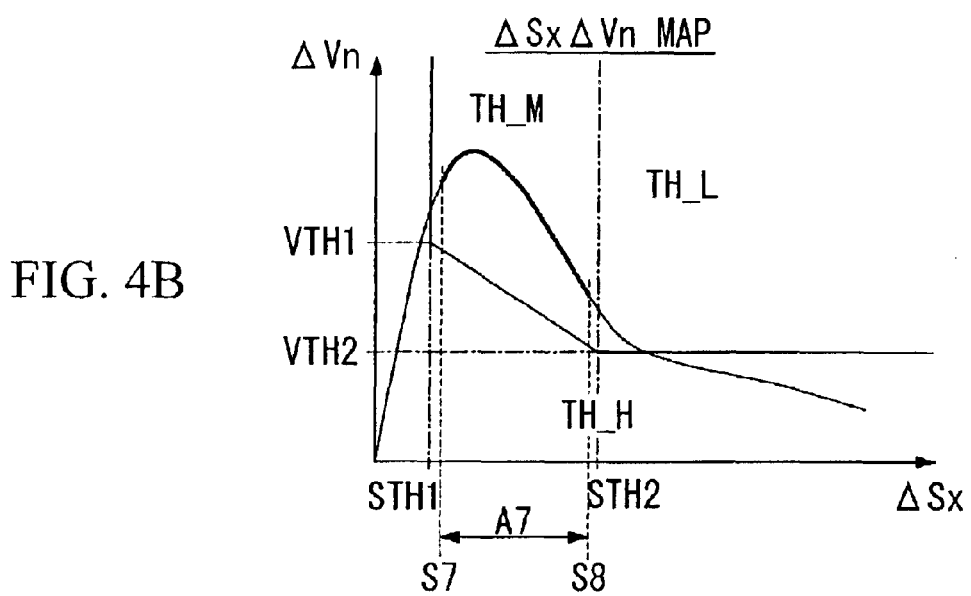
Figure 4C:
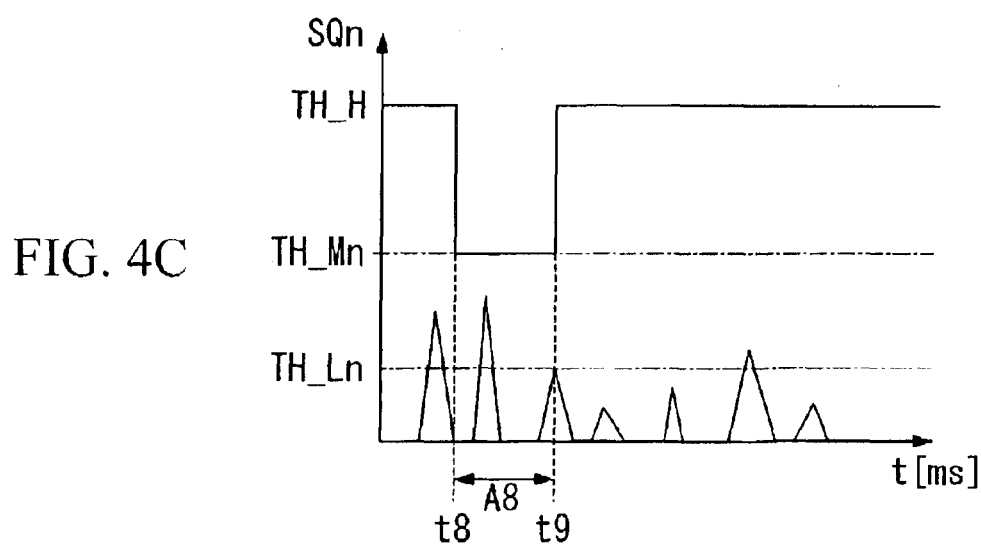

On the other hand, an example in which the starting signal for the occupant-protecting apparatus is not output is explained with reference to FIGS. 4A to 4C, in contrast to the case shown in FIGS. 3A and 3B. As shown in FIG. 4A, it may be understood that an area A6 in the time intervals t8 to t9 is indicative of a collision because the change in the acceleration is large. On the other hand, as shown in FIG. 4B, from the points of view of an occupant's moving speed and moving amount, an area A7 in the moving amounts S7 to S8 corresponds to cases in which the change in acceleration is large. Here, the frequency component determining threshold (level threshold) which corresponds to the level value for the frequency component which indicates the destruction of the vehicle is set at the middle-level threshold TH_M in an area A8 in the time intervals t8 to t9 which corresponds to the area A6 in which the change in acceleration is large, as shown in FIG. 4C, according to the map for the S-V characteristics. Therefore, the activation signal for the occupant-protecting apparatus will not be output.

As explained above, by the vehicle collision decision apparatus 1 according to the present embodiment, it is possible to analyze and determine whether or not the occupant-protecting apparatus should be started in a collision by monitoring a moving characteristics of the occupants which is calculated by the occupant moving characteristics calculating device 12 and the occupant moving characteristics determining device 13, and determining whether or not the collision continues according to the acceleration which is determined by the acceleration change determining device 15 and furthermore determining by the frequency component determining device 19 according to the frequency component whether or not the chassis of the vehicle is broken.

That is, in the case in which both the moving speed and the moving amount of the occupant is greater than the predetermined values, the occupant-protecting apparatus is activated. Also, in the case in which the moving amount of the occupant is small and the moving speed of the occupant is high, or in the case in which the moving amount of the occupant is large and the moving speed of the occupant is low, whether or not the collision continues is determined according to the change in acceleration so as to determine whether or not the occupant-protecting apparatus should be started. Furthermore, the frequency component determining threshold for determining the degree for the destruction in the vehicle is selected according to the occupant's moving characteristics and the colliding condition.

By doing this, in a head-on collision, when the impact is so slight that it is not necessary to start the occupant-protecting apparatus, it is determined that the collision has ended according to the change in acceleration. The frequency component determining threshold for determining the degree of the destruction of the vehicle is maintained at a high level (for example, at the determining threshold TH_H). in the case in which the collision continues such as an oblique collision and it is necessary to activate the occupant-protecting apparatus, it is determined that the collision continues according to the change in acceleration. The frequency component determining threshold for determining the degree of damage of the vehicle is adjusted to a low level (for example, at the determining threshold TH_L). By doing this, the condition and the impact of the collision is determined so as to activate the occupant-protecting apparatus, such as an air bag device and a seat belt pretension device, appropriately and rapidly.

The vehicle collision decision apparatus according the first embodiment in the present inventions is explained above. The vehicle collision decision apparatus according to the present invention can be realized even if a part of structures in the vehicle collision decision apparatus according to the first embodiment is omitted. Thus, the vehicle collision decision apparatus, in which a part of the structure of which is omitted is explained as second to fourth embodiments as follows. Second Embodiment FIG. 5 is a general view of a vehicle collision decision apparatus according to a second embodiment in the present invention.

As shown in FIG. 5, a vehicle collision decision apparatus 2 according to the second embodiment comprises an acceleration sensor 11 for measuring the acceleration which acts on the vehicle, an occupant moving characteristics calculating device 12 for calculating the moving characteristics of the occupant according to the acceleration signal which is generated in the acceleration sensor 11, an occupant moving characteristics determining device 13 for determining whether or not the moving characteristics of the occupant exceed a moving characteristics determining threshold.

Also, a vehicle collision decision apparatus 2 comprises a frequency component calculating device 17 for decomposing the waveform of the acceleration signal which is generated in the acceleration sensor 11 into frequency components, a frequency component determining threshold switching device 18-1 for setting a frequency component determining threshold according to the frequency component based on a result which is determined in the occupant moving characteristics determining device 13, a frequency component determining device 19 for determining whether or not the frequency component exceeds the frequency component determining threshold, and a start signal generating device 20 for generating a control signal for controlling the occupant-protecting apparatus based on a result which is determined in the frequency component determining device 19.

The frequency component determining threshold switching device 18-1 selects any one of, for example, a high-level threshold TH_H and a middle-level threshold TH_M and a low-level threshold TH_L according only to the result determined by the occupant moving characteristics determining device 13 so as to be output to the frequency component determining device 19 as a frequency component determining threshold (level threshold) for a level value for the frequency component. The details for the selecting conditions for determining the threshold are explained later.

Here, structures such as a acceleration sensor 11, an occupant moving characteristics calculating device 12, an occupant moving characteristics determining device 13, a frequency component calculating device 17, a frequency component determining device 19, and a start signal generating device 20 are the same as those explained in the first embodiment; thus, explanations therefore are omitted.

Figure 6:
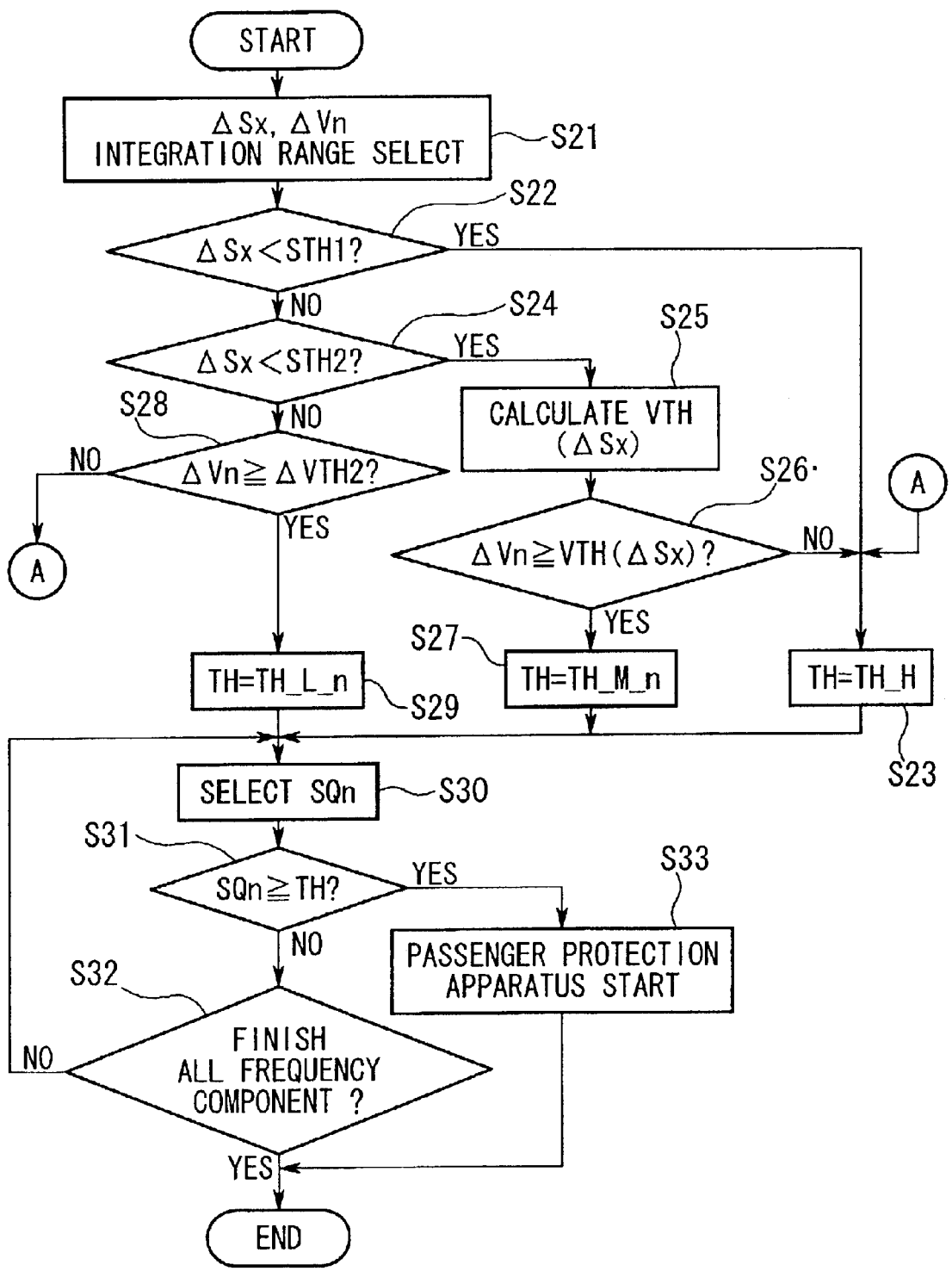
FIG. 6 is a flow chart showing operations which are performed by the vehicle collision decision apparatus according to the second embodiment of the present invention.

Next, operations for the vehicle collision decision apparatus 2 of the present embodiment are explained with reference to the drawings. FIG. 6 is a flow chart showing operations which are performed by the vehicle collision decision apparatus 2 according to the first embodiment in the present invention.

First, an occupant moving characteristics calculating device 12 selects integration sections for the moving amount ΔSx for the occupant and the moving speed ΔVn so as to designate a map for S-V characteristics as a reference waveform (step S21). Here, as in a manner similar to the first embodiment, the integration sections can be selected individually for the moving amount ΔSx for the occupant and the moving speed ΔVn among, for example, sections 1 to 24 (ms).

After the occupant moving characteristics calculating device 12 designates a map for the S-V characteristics, next, the occupant moving characteristics determining device 13 determines whether or not the moving amount ΔSx for the occupant is less than the first moving amount determining threshold STH1 (step S22).

In the case in which the moving amount ΔSx for the occupant is less than the first moving amount determining threshold STH1 in the step S22 (YES in the step S22), the frequency component determining threshold switching device 18-1 selects the high-level threshold TH_H as a frequency component determining threshold (level threshold) for the level value of the frequency component which is obtained in the frequency component calculating device 17 so as to be output to the frequency component determining device 19 (step S23).

On the other hand, in the case in which the moving amount ΔSx for the occupant is not less than the first moving amount determining threshold STH1 in the step S22 (NO in the step S22), the occupant moving characteristics determining device 13 determines whether or not the moving amount ΔSx for the occupant is less than a second moving amount determining threshold STH2 (step 524).

In the step S24, in the case in which the moving amount ΔSx for the occupant is less than the second moving amount determining threshold STH2 (YES in the step S24), the occupant moving characteristics determining device 13 calculates the VTH (ΔSX) (step S25).

After the determining threshold VTH (ΔVx) is determined, next, the occupant moving characteristics determining device 13 determines whether or not the moving speed ΔVn for the occupant is less than the determining threshold VTH (ΔVx) (step S26).

In the case in which the moving speed ΔVn for the occupant is less than the determining threshold VTH (ΔSx) in the step S26 (NO in the step S26), the frequency component determining threshold switching device 18-1 selects the high-level threshold TH_H as a frequency component determining threshold (level threshold) according to the level value for the frequency component which is determined in the frequency component calculating device 17 so as to be output to the frequency component determining device 19 (step 523).

Also, in the case in which the moving speed ΔVn for the occupant is not less than the determining threshold VTH (ΔSx) in the step S26 (YES in the step S26), the frequency component determining threshold switching device 18-1 selects the middle-level threshold TH_M as a frequency component determining threshold (level threshold) according to the level value for the frequency component which is determined in the frequency component calculating device 17 so as to be output to the frequency component determining device 19 (step S27). Here, for the middle-level threshold TH_M, n determining thresholds which correspond to each frequency component are set.

On the other hand, in the case in which the moving amount ΔSx for the occupant is not less than the second moving amount determining threshold STH2 in the step 324 (NO in the step S24), the occupant moving characteristics determining device 13 determines whether or not the moving speed ΔVn for the occupant is less than the second moving speed determining threshold VTH2 (step S28).

In the case in which the moving speed ΔVn for the occupant is less than the second moving speed determining threshold VTH2 in the step S28 (NO in the step S28), the frequency component determining threshold switching device 18-1 selects the high-level threshold TH_H as a frequency component determining threshold (level threshold) for the level value of the frequency component which is determined in the frequency component calculating device 17 so as to be output to the frequency component determining device 19 (step S23).

Also, in the case in which the moving speed ΔVn for the occupant is greater than the second moving speed determining threshold VTH2 in the step S28 (YES in the step S28), the frequency component determining threshold switching device 18-1 selects the low-level threshold TH_L as a frequency component determining threshold (level threshold) for the level value of the frequency component which is determined in the frequency component calculating device 17 so as to be output to the frequency component determining device 19 (step S29). Here, for the low-level threshold TH_L, n determining thresholds which correspond to each frequency component are set.

As explained above, after the frequency component determining threshold (level threshold) for the level value of the frequency component which is used in the frequency component determining device 19 is set, next, the frequency component determining device 19 selects the frequency component SQn (step S30) so as to determine whether or not the frequency component SQn is larger than the frequency component determining threshold (level threshold) (step S31).

In the case in which the frequency component SQn is as large or larger than the frequency component determining threshold (level threshold) in the step S31 (YES in the step S31), the activation signal generating device 20 outputs an activation signal for the occupant-protecting apparatus (step S33) and completes the collision decision operation.

Also, in the case in which the frequency component SQn is less than the frequency component determining threshold (level threshold) in the step S31 (NO in the step S31), whether or not all the frequency components were determined is determined (step S32). In the case in which all the frequency components have not been determined yet (NO in the step S32), the above-explained operation is repeated from the step S30.

On the other hand, all the frequency components were determined in the step 332 (YES in the step S32), the collision decision operation is finished.

Figure 7A:
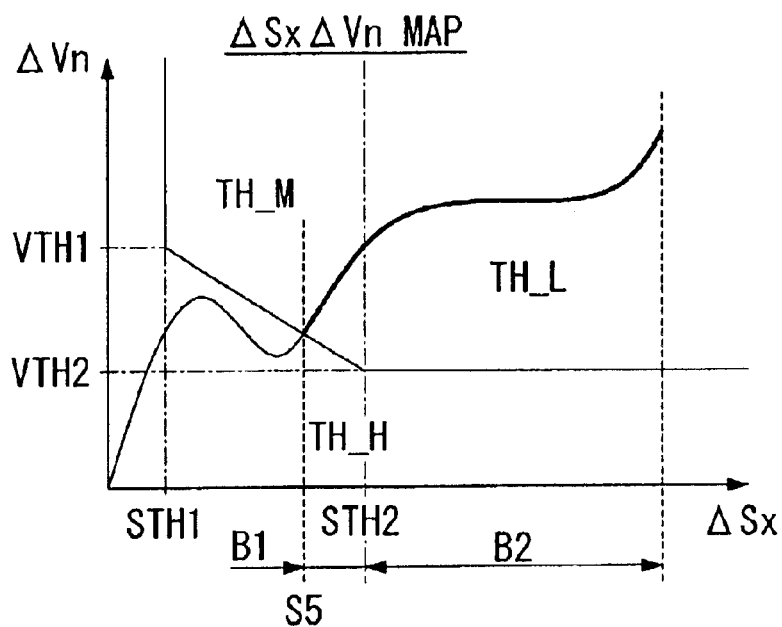
FIGS. 7A and 7B are graphs showing operations which are performed by the vehicle collision decision apparatus according to the second embodiment of the present invention.
Figure 7B:
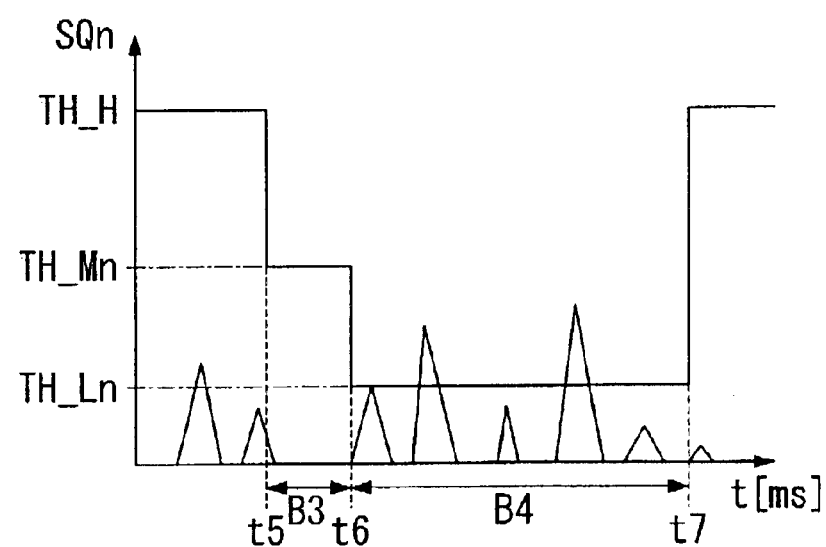

Next, an example for the operation in the vehicle collision decision apparatus 2 according to the present embodiment is explained with reference to the drawings. As shown in FIG. 7A, it may be understood that an area B1 in the moving amounts S5 to STH2 and an area B2 in the moving amounts more than STH2 are dangerous. In the case in which the moving amount of the occupant is less than the STH2, the moving speed of the occupant is lower than in the case in which the moving amount of the occupant is greater than STH2; thus, it is less dangerous. Therefore, as shown in FIG. 7B, the frequency component determining threshold (level threshold) for the level value of the frequency component which indicates the destruction of the vehicle is set at a middle-level threshold TH_M in an area B3 between the time intervals t5 to t6 which correspond to the area B1 for the moving amount of the occupant. The frequency component determining threshold (level threshold) for the level value of the frequency component which indicates the destruction for the vehicle is set at a low-level threshold TH_L in an area B4 between the time intervals t6 to t7 which correspond to the area B2 for the moving amount of the occupant so as to output the activation signal for the occupant-protecting apparatus.

As explained above, by the vehicle collision decision apparatus 2 according to the present embodiment, it is possible to analyze and determine whether or not the occupant-protecting apparatus should be activated in a collision by monitoring a moving characteristics of the occupants which are calculated by the occupant moving characteristics calculating device 12 and the occupant moving characteristics determining device 13 and monitoring the damage to the vehicle by the frequency component determining device 19 by using frequency components.

That is, in the case in which both the moving speed and the moving amount of the occupant is greater than predetermined values, the occupant-protecting apparatus is activated. Also, in the case in which the moving amount of the occupant is small and the moving speed of the occupant is high, or in the case in which the moving amount of the occupant is large and the moving speed of the occupant is low, the frequency component determining threshold for determining the degree for the damage to the vehicle is selected according to the occupant moving characteristics.

By doing this, for example, in the case in which both the moving speed and the moving amount of the occupant are less than the predetermined values, the frequency component determining threshold for determining the degree of damage to the vehicle is set at a high level such as the determining threshold TH_H. In the case in which either one of the moving speed of the occupant and the moving amount of the occupant is greater than the predetermined value, the frequency component determining threshold for determining the degree of damage to the vehicle is set at a lower level such as the determining threshold TH_M. In the case in which both the moving speed and the moving amount of the occupant are greater than the predetermined values, the frequency component determining threshold for determining the degree of damage to the vehicle is set at a further lower level such as the determining threshold TH_L. By doing this, the condition and the impact of the collisions is determined so as to activate an occupant-protecting apparatus, such as an air bag device and a seat belt pretension device, appropriately and quickly.

Third Embodiment

Figure 8:
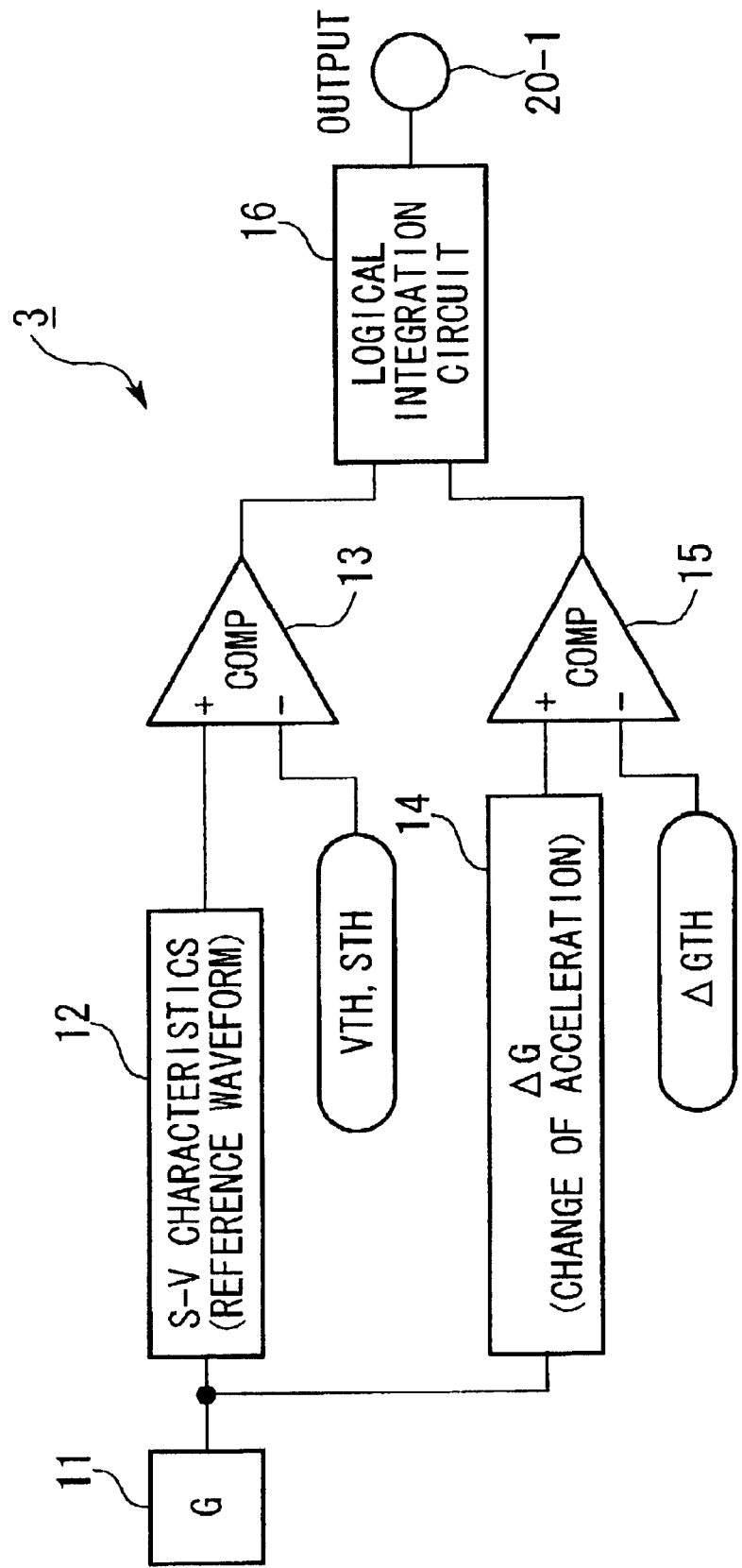
FIG. 8 is a general diagram of a vehicle collision decision apparatus according to a third embodiment of the present invention.

FIG. 8 is a general diagram of a vehicle collision decision apparatus according to a third embodiment in the present invention.

As shown in FIG. 8, a vehicle collision decision apparatus 3 according to the present embodiment comprises an acceleration sensor 11 for measuring the acceleration which acts on the vehicle, an occupant moving characteristics calculating device 12 for calculating the moving characteristics of occupants according to the acceleration signal which is generated in the acceleration sensor 11, an occupant moving characteristics determining device 13 for determining whether or not the moving characteristics of the occupants exceed a moving characteristics determining threshold, an acceleration change calculating device 14 for calculating a change in the acceleration signal which is generated in the acceleration sensor 11, and an acceleration change determining section or device 15 for determining whether or not the change in acceleration exceeds the acceleration determining threshold.

Also, a vehicle collision decision apparatus 3 comprises a logic integrating circuit 16 for integrating a logical result determined in the occupant moving characteristics determining device 13 and a logical result determined in the acceleration change determining section 15, and an activation signal generating device 20-1 for generating a control signal for controlling the occupant-protecting apparatus according to results which are output from the logic integrating circuit 16 and determined by the occupant moving characteristics determining device 13 and the acceleration change determining section 15.

Here, the start signal generating device 20-1 outputs a command signal for activating the occupant-protecting apparatus, such as an air bag device and a seat belt pretension device (which are not shown in the drawing), according to results which are output from the logic integrating circuit 16 and determined by the occupant moving characteristics determining device 13 and the acceleration change determining section 15. The details for the command signal are explained later.

Also, structures such as an acceleration sensor 11, an occupant moving characteristics calculating device 12, an occupant moving characteristics determining device 13, an acceleration change calculating device 14, an acceleration change determining section 15, and a logic integrating circuit 16 are the same as those explained in the first embodiment; thus, explanations therefor are omitted.

Figure 9:
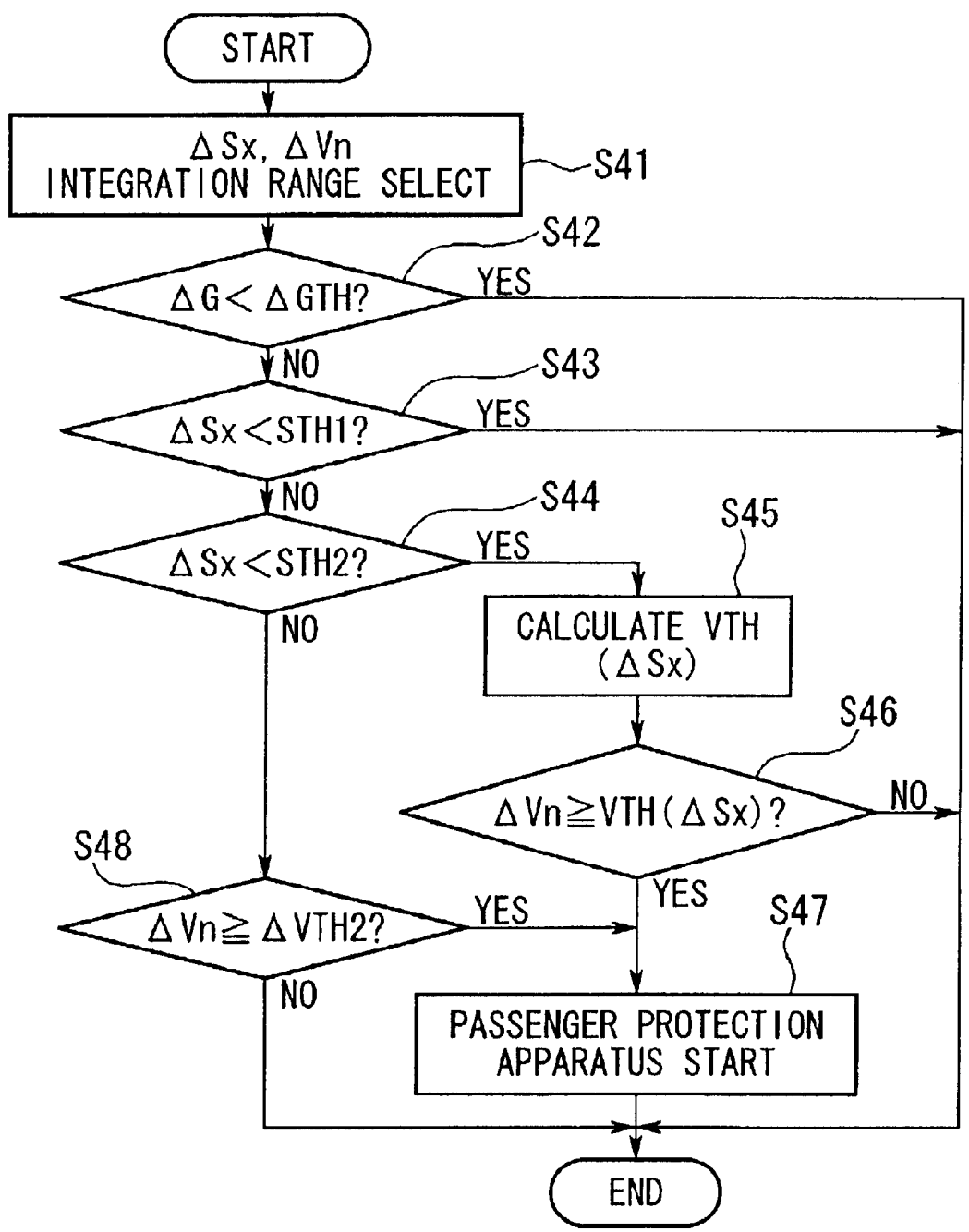
FIG. 9 is a flow chart showing operations which are performed by the vehicle collision decision apparatus according to the third embodiment of the present invention.

Next, operations for the vehicle collision decision apparatus 3 in the present embodiment is explained with reference to the drawings. FIG. 9 is a flow chart showing operations which are performed by the vehicle collision decision apparatus 3 according to the present embodiment of the present invention.

First, an occupant moving characteristics calculating device 12 selects integration sections for the moving amount $\Delta Sx$ for the occupant and the moving speed $\Delta Vn$ so as to designate a map for S-V characteristics as a reference waveform (step S41). Here, similarly to the first embodiment, the integration sections can be selected individually for the moving amount $\Delta Sx$ for the occupant and the moving speed $\Delta Vn$ among, for example, sections 1 to 24 (ms).

Figure 10A:
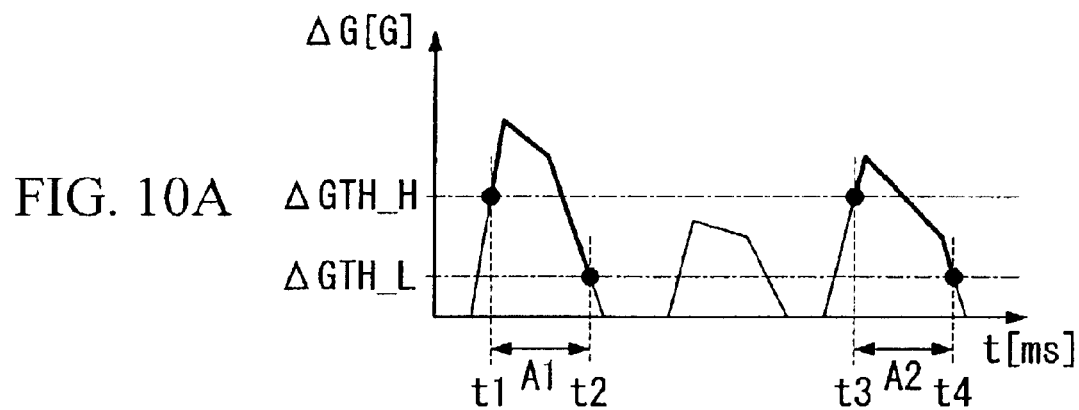
FIGS. 10A and 10B are graphs showing operations which are performed by the vehicle collision decision apparatus according to the third embodiment of the present invention.

After the occupant moving characteristics calculating device 12 designates the map for the S-V characteristics, the acceleration change determining device 15 determines whether or not the change in the calculated acceleration in the acceleration change calculating device 14 is less than the acceleration determining threshold $\Delta GTH$ (step S42). Here, the acceleration determining threshold $\Delta GTH$ has a hysteresis for maintaining the threshold. As shown in FIG. 10A, the acceleration determining threshold $\Delta GTH$ determines the change in acceleration by using the high threshold $\Delta GTH\_H$ and the low threshold $\Delta GTH\_L$. In FIG. 10A, similarly to the first embodiment, the acceleration determining threshold $\Delta GTH$ determines the change in acceleration by using the high threshold $\Delta GTH\_H$ and the low threshold $\Delta GTH\_L$.

In the step S42, in the case in which the change in acceleration exceeds the acceleration determining threshold $\Delta GTH$ (NO in the step S42), the occupant moving characteristics determining device 13 determines whether or not the moving amount $\Delta Sx$ for the occupant is less than a first moving amount determining threshold STH1 (step S43).

In the case in which the change in acceleration is less than the acceleration determining threshold $\Delta GTH$ (YES in the step S42) in the step 542, or in the case in which the moving amount $\Delta Sx$ for the occupant is less than the first moving amount determining threshold STH1 in the step S43 (YES in the step S43), the collision determining operation is finished.

On the other hand, in the case in which the moving amount $\Delta Sx$ for the occupant is not less than the first moving amount determining threshold STH1 in the step S43 (NO in the step S43), the occupant moving characteristics determining device 13 determines whether or not the moving amount $\Delta Sx$ for the occupant is less than a second moving amount determining threshold STH2 (step S44).

In the step S44, in the case in which the moving amount $\Delta Sx$ for the occupant is less than the second moving amount determining threshold STH2 (YES in the step S44), the occupant moving characteristics determining device 13 calculates the VTH ($\Delta Sx$) (step S45).

After the determining threshold VTH ($\Delta Vx$) is determined, next, the occupant moving characteristics determining device 13 determines whether or not the moving speed $\Delta Vn$ for the occupant is less than the determining threshold VTH ($\Delta Vx$) (step S46).

In the case in which the moving speed $\Delta Vn$ for the occupant is lower than the determining threshold VTH ($\Delta Sx$) in the step S46 (NO in the step S46), the collision determining operation is finished.

Also, in the case in which the moving speed $\Delta Vn$ of the occupant is not less than the determining threshold VTH ($\Delta Sx$) in the step S46 (YES in the step S46), the activation signal generating device 20-1 outputs the activate signal for the occupant protecting device (step S47) so as to finish the collision determining operation.

On the other hand, in the case in which the moving amount $\Delta Sx$ for the occupant is not less than the second moving amount determining threshold STH2 in the step S44 (NO in the step S44), the occupant moving characteristics determining device 13 determines whether or not the moving speed $\Delta Vn$ for the occupant is less than the second moving speed determining threshold VTH2 (step S48).

In the case in which the moving speed $\Delta Vn$ for the occupant is less than the second moving speed determining threshold VTH2 in the step S48 (NO in the step S48), the collision determining operation is finished.

Also, in the case in which the moving speed $\Delta Vn$ of the occupant is not less than the determining threshold VTH2 in the step S48 (YES in the step S48), the start signal generating device 20-1 outputs the start signal for the occupant protecting device (step S47) so as to finish the collision determining operation.

Figure 10B:
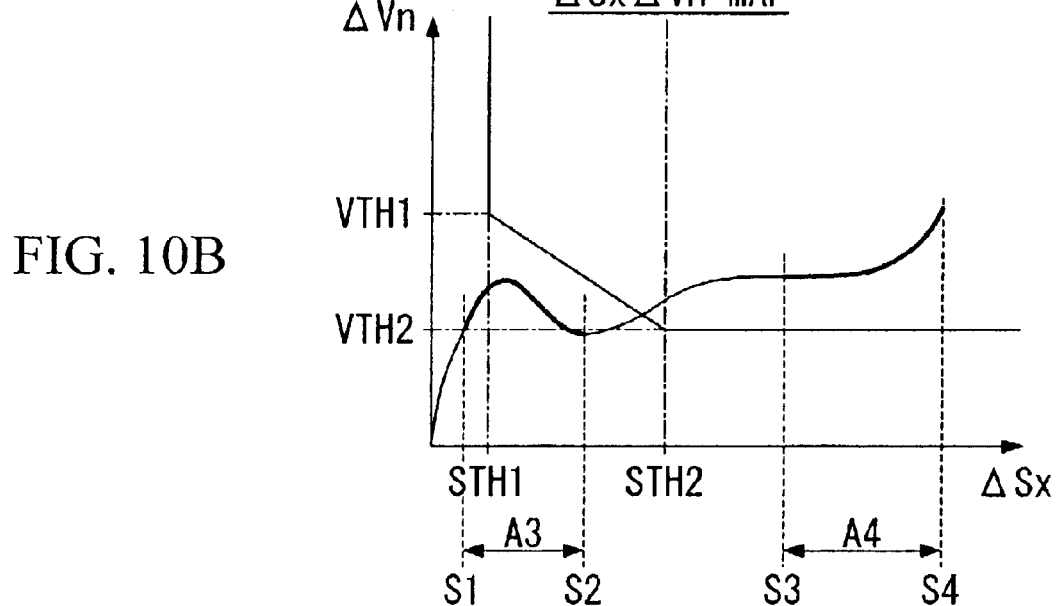

Next, an example for the operation in the vehicle collision decision apparatus 3 according to the present embodiment is explained with reference to drawings. As shown in FIG. 10A, it may be understood that an area A1 in the time intervals t1 to t2 and an area A2 in the time intervals t3 to t4 are indicative of a collision because the change in the acceleration is large. On the other hand, as shown in FIG. 10B, from the point of view of an occupant's moving speed and moving amount, an area A3 in the moving amounts S1 to S2 and an area A4 in the moving amounts S3 to S4 correspond to cases in which the change in acceleration is large. Thus, it is possible to understand that the area A4 in the moving amount S3 to S4 in which the change in moving amount for the occupant is large is dangerous. Therefore, the start signal generating device 20-1 outputs the start signal for the occupant-protecting apparatus.

As explained above, by the vehicle collision decision apparatus 3 according to the present embodiment, it is possible to analyze and determine whether or not the occupant-protecting apparatus should be activated in a collision by monitoring moving characteristics of the occupants which are calculated by the occupant moving characteristics calculating device 12 and the occupant moving characteristics determining device 13, and determining whether or not the collision continues according to the acceleration which is determined by the acceleration change determining device 15.

That is, in the case in which both the moving speed and the moving amount of the occupant are greater than the predetermined values, the occupant-protecting apparatus is activated. Also, in the case in which the moving amount of the occupant is small and the moving speed of the occupant is high, or in the case in which the moving amount of the occupant is large and the moving speed of the occupant is low, whether or not the collision continues is determined according to the change in acceleration so as to determine whether or not the occupant-protecting apparatus should be activated.

By doing this, in a head-on collision, when the impact is so slight that it is not necessary to activate the occupant-protecting apparatus, it is determined that the collision has ended according to the change in acceleration. In the case in which the collision continues such as in an oblique collision and it is necessary to activate the occupant-protecting apparatus, it is determined that the collision continues according to the change in acceleration. By doing this, the condition and the impact of the collision is determined so as to activate the occupant-protecting apparatus, such as an air bag device and a seat belt pre-tension device, appropriately and rapidly.

Fourth Embodiment

Figure 11:
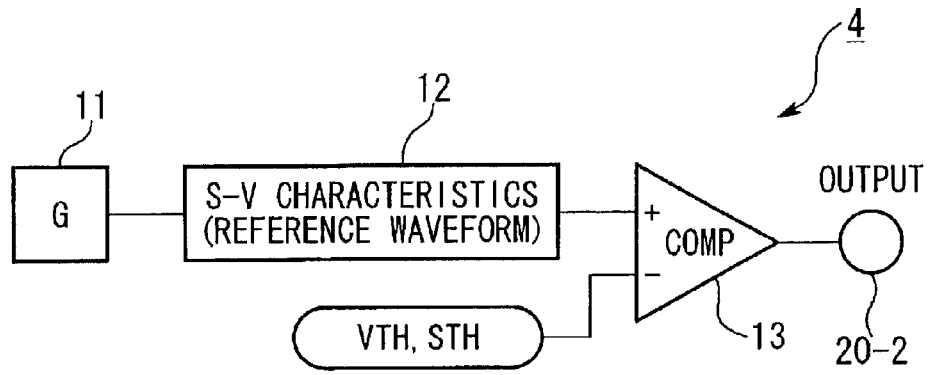
FIG. 11 is a general diagram of a vehicle collision decision apparatus according to a fourth embodiment of the present invention.

FIG. 11 is a general diagram of a vehicle collision decision apparatus according to a fourth embodiment of the present invention.

As shown in FIG. 11, a vehicle collision decision apparatus 4 according to the present embodiment comprises an acceleration sensor 11 for measuring the acceleration which acts on the vehicle, an occupant moving characteristics calculating device 12 for calculating the moving characteristics of the occupant according to the acceleration signal which is generated in the acceleration sensor 11, an occupant moving characteristics determining device 13 for determining whether or not the moving characteristics of the occupant exceed a moving characteristics determining threshold, and an activation signal generating device 20-2 for generating a control signal for controlling the occupant-protecting apparatus according to results which are determined by the occupant moving characteristics determining device 13.

Here, the start signal generating device 20-2 outputs a command signal for activating the occupant-protecting apparatus, such as an air bag device and a seat belt pre-tension device (which are not shown in the drawings), according to a result which is determined in the occupant moving characteristics determining device 13.

Also, structures such as an acceleration sensor 11, an occupant moving characteristics calculating device 12, and an occupant moving characteristics determining device 13 are the same as those explained in the first embodiment; thus, explanations therefore are omitted.

Figure 12:
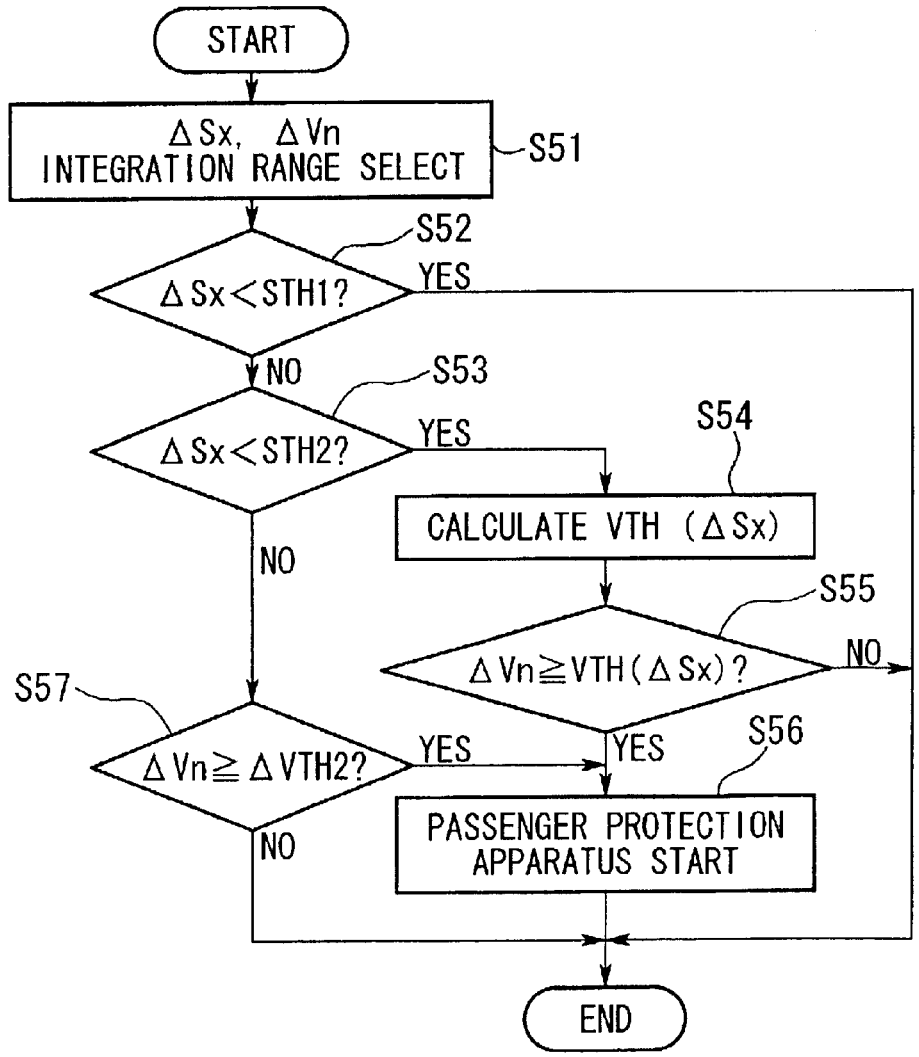
FIG. 12 is a flow chart showing operations which are performed by the vehicle collision decision apparatus according to the fourth embodiment of the present invention.

Next, operations for the vehicle collision decision apparatus 4 in the present embodiment are explained with reference to the drawings. FIG. 12 is a flow chart showing operations which are performed by the vehicle collision decision apparatus 4 according to the fourth embodiment of the present invention.

First, an occupant moving characteristics calculating device 12 selects integration sections for the moving amount ΔSx for the occupant and the moving speed ΔVn so as to produce a map for S-V characteristics as a reference waveform (step S51). Here, similarly to the first embodiment, the integration sections can be selected individually for the moving amount ΔSx for the occupant and the moving speed, ΔVn among, for example, sections 1 to 24 (ms).

After the occupant moving characteristics calculating device 12 produces a map for the S-V characteristics, next, the occupant moving characteristics determining device 13 determines whether or not the moving amount ΔSx for the occupant is less than the first moving amount determining threshold STH1 (step S52).

In the case in which the moving amount ΔSx for the occupant is less than the first moving amount determining threshold STH1 in the step S52 (YES in the step S52), the collision determining operation is finished.

On the other hand, in the case in which the moving amount ΔSx for the occupant is not less than the first moving amount determining threshold STH1 in the step S52 (NO in the step S52), the occupant moving characteristics determining device 13 determines whether or not the moving amount ΔSx for the occupant is less than a second moving amount determining threshold STH2 (step S53).

In the step S53, in the case in which the moving amount ΔSx for the occupant is less than the second moving amount determining threshold STH2 (YES in the step S53), similarly to the first embodiment, the occupant moving characteristics determining device 13 calculates the VTH (ΔSX) (step S54).

After the determining threshold VTH (ΔSx) is determined, next, the occupant moving characteristics determining device 13 determines whether or not the moving speed ΔVn for the occupant is not less than the determining threshold VTH (ΔVx) (step S55).

In the case in which the moving speed ΔVn for the occupant is less than the determining threshold VTH (ΔSx) in the step S55 (NO in the step S55), the collision determining operation is finished.

Also, in the case in which the moving speed □Vn for the occupant is not less than the determining threshold VTH (ΔSx) in the step S55 (YES in the step S55), the activation signal generating device 20-2 outputs a command signal for activating the occupant-protecting apparatus (step S56) so as to finish the collision determining operation.

On the other hand, in the case in which the moving amount ΔSx for the occupant is not less than the second moving amount determining threshold STH2 in the stop 553 (NO in the step S53), the occupant moving characteristics determining device 13 determines whether or not the moving speed ΔVn for the occupant is not less than the second moving speed determining threshold VTH2 (step S57).

In the case in which the moving speed ΔVn for the occupant is lower than the second moving speed determining threshold VTH2 in the step S28 (NO in the step S55), the collision determining operation is finished.

Also, in the case in which the moving speed ΔVn for the occupant is not less than the second moving speed determining threshold VTH2 in the step S57 (YES in the step S57), the start signal generating device 20-2 outputs a command signal for starting the occupant-protecting apparatus (step S56) so as to finish the collision determining operation.

Figure 13:
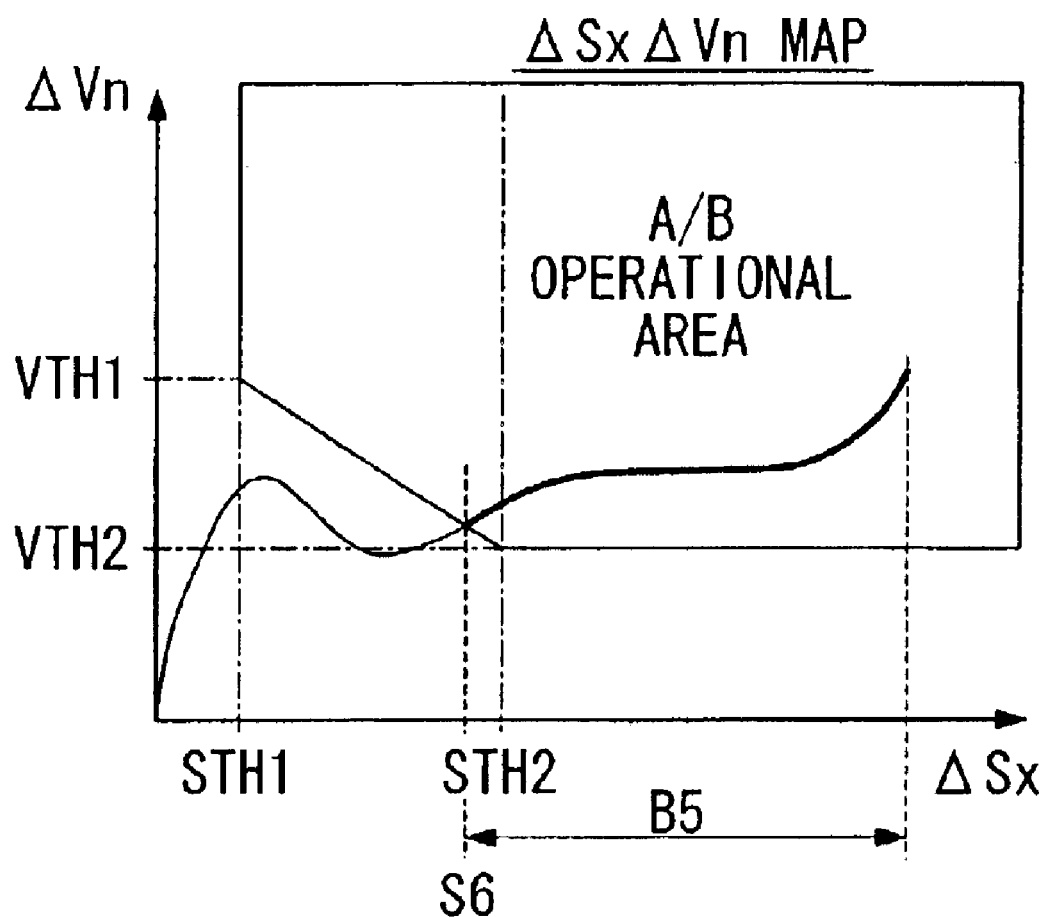
FIG. 13 is a graph showing operations which are performed by the vehicle collision decision apparatus according to the fourth embodiment of the present invention.

Next, an example for the operation in the vehicle collision decision apparatus 4 according to the present embodiment is explained with reference to the drawings. As shown in FIG. 13, it may be understood that an area B5 at the moving amounts which are greater than S6 is dangerous from the moving speed and the moving amounts point of view.

Therefore, the start signal generating device 20-2 outputs a command signal for starting the occupant-protecting apparatus.

As explained above, by the vehicle collision decision apparatus 4 according to the present embodiment, it is possible to analyze and determine whether or not the occupant-protecting apparatus should be started in a collision by monitoring moving characteristics of the occupants which are calculated by the occupant moving characteristics calculating device 12 and the occupant moving characteristics determining device 13.

That is, in the case in which both the moving speed and the moving amount of the occupant are greater than the predetermined values, the occupant-protecting apparatus is activated. Also, in the case in which the moving amount of the occupant is small and the moving speed of the occupant is high, or in the case in which the moving amount of the occupant is large and the moving speed of the occupant is low, whether or not the occupant-protecting apparatus should be activated is determined.

By doing this, it is possible to respond to various collision conditions such as head-on collisions and offset collisions so as to activate the occupant-protecting apparatus, such as an air bag device and a seat belt pre-tension device, appropriately and rapidly in the case in which either one of the moving speed of the occupant and the moving amount of the occupant is larger than predetermined values.

Although there have been described what are the present embodiments of the invention, it will be understood by persons skilled in the art that variations and modifications may be made thereto without departing from the spirit or essence of the invention.

What is claimed is:

1. A vehicle collision decision apparatus comprising:
    an acceleration measuring device which measures an acceleration of a vehicle and generates an acceleration signal;
    an occupant movement characteristics calculating device which calculates occupant movement characteristics according to the acceleration signal from the acceleration measuring device;
    an occupant movement characteristics determining device which determines whether or not the occupant movement characteristics exceed a predetermined movement characteristics determining threshold;
    a frequency analyzing device which decomposes a waveform of the acceleration signal into a frequency component;
    a frequency component determining threshold setting device which sets a predetermined frequency component determining threshold for the frequency component according to results by the occupant movement characteristics determining device;
    a frequency component determining device which determines whether or not the frequency component exceeds the frequency component determining threshold; and
    a control signal generating device which generates a control signal that controls an occupant-protecting apparatus according to results by the frequency component determining device.

2. A vehicle collision decision apparatus comprising:
    an acceleration measuring device which measures an acceleration of a vehicle and generates an acceleration signal;
    an occupant movement characteristics calculating device which calculates occupant movement characteristics according to the acceleration signal from the acceleration measuring device;
    an occupant movement characteristics determining device which determines whether or not the occupant movement characteristics exceed a predetermined movement characteristics determining threshold;
    an acceleration change calculating device which calculates changes in the acceleration signal;
    an acceleration change determining device which determines whether or not the changes in the acceleration signal exceed a predetermined acceleration determining threshold; and
    a control signal generating device which generates a control signal that controls an occupant-protecting apparatus according to results determined by the occupant movement characteristics determining device and the acceleration change determining device.

3. A vehicle collision decision apparatus comprising:
    an acceleration measuring device which measures an acceleration of a vehicle and generates an acceleration signal;
    an occupant movement characteristics calculating device which calculates occupant movement characteristics according to the acceleration signal from the acceleration measuring device,
    an occupant movement characteristics determining device which determines whether or not the occupant movement characteristics exceed a predetermined movement characteristics determining threshold;
    an acceleration change calculating device which calculates changes in the acceleration signal;
    an acceleration change determining device which determines whether or not the changes in the acceleration signal exceed a predetermined acceleration determining threshold;
    a frequency component analyzing device which decomposes a waveform of the acceleration signal into a frequency component;
    a frequency component determining threshold setting device which sets a predetermined frequency component determining threshold for the frequency component according to results by the occupant movement characteristics determining device and the acceleration change determining device;
    a frequency component determining device which determines whether or not the frequency component exceeds the frequency component determining threshold; and
    a control signal generating device which generates a control signal that controls an occupant-protecting apparatus according to results determined by the frequency component determining device.

4. A vehicle collision decision apparatus according to claim 1 wherein:
    the occupant movement characteristics calculating device calculates a moving speed and a moving amount of the occupant; and
    the occupant movement characteristics determining device determines whether or not the moving speed of the occupant exceeds a predetermined moving speed determining threshold and the moving amount of the occupant exceeds a predetermined moving amount determining threshold.

5. A vehicle collision decision apparatus according to claim 2 wherein:
    the occupant movement characteristics calculating device calculates a moving speed and a moving amount of the occupant; and
    the occupant movement characteristics determining device determines whether or not the moving speed of the occupant exceeds a predetermined moving speed determining threshold and the moving amount of the occupant exceeds a predetermined moving amount determining threshold.

6. A vehicle collision decision apparatus according to claim 3 wherein:

the occupant movement characteristics calculating device calculates a moving speed and a moving amount of the occupant; and the occupant movement characteristics determining device determines whether or not the moving speed of the occupant exceeds a predetermined moving speed determining threshold and the moving amount of the occupant exceeds a predetermined moving amount determining threshold.

7. A vehicle collision decision method comprising:

an acceleration measuring step for measuring an acceleration of a vehicle and generating an acceleration signal;

an occupant movement characteristics calculating step for calculating occupant movement characteristics according to the acceleration signal from the acceleration measuring device;

an occupant movement characteristics determining step for determining whether or not the occupant movement characteristics exceed a predetermined movement characteristics determining threshold;

a frequency analyzing step for decomposing a waveform of the acceleration signal into a frequency component;

a frequency component determining threshold setting step for setting a predetermined frequency component determining threshold for the frequency component according to results obtained in the occupant movement characteristics determining step;

a frequency component determining step for determining whether or not the frequency component exceeds the frequency component determining threshold; and a control signal generating step for generating a control signal for controlling an occupant-protecting apparatus according to results obtained in the frequency component determining step.

8. A vehicle collision decision method according to claim 7 wherein:

a moving speed and a moving amount of the occupant are calculated in the occupant movement characteristics calculating step; and whether or not the moving speed of the occupant exceeds a predetermined moving speed determining threshold and whether or not the moving amount of the occupant exceeds a predetermined moving amount determining threshold are determined in the occupant movement characteristics determining step.

9. A vehicle collision decision method comprising:

an acceleration measuring step for measuring an acceleration of a vehicle and generating an acceleration signal;

an occupant movement characteristics calculating step for calculating occupant movement characteristics according to the acceleration signal from the acceleration measuring step;

an occupant movement characteristics determining step for determining whether or not the occupant movement characteristics exceed a predetermined movement characteristics determining threshold;

an acceleration change calculating step for calculating changes in the acceleration signal;

an acceleration change determining step for determining whether or not the changes in the acceleration signal exceed a predetermined acceleration determining threshold; and a control signal generating step for generating a control signal for controlling an occupant-protecting apparatus according to results determined in the occupant movement characteristics determining step and the acceleration change determining step.

10. A vehicle collision decision method according to claim 9 wherein:

a moving speed and a moving amount of the occupant are calculated in the occupant movement characteristics calculating step; and whether or not the moving speed of the occupant exceeds a predetermined moving speed determining threshold and whether or not the moving amount of the occupant exceeds a predetermined moving amount determining threshold are determined in the occupant movement characteristics determining step.

11. A vehicle collision decision method comprising:

an acceleration measuring step for measuring an acceleration of a vehicle and generating an acceleration signal;

an occupant movement characteristics calculating step for calculating occupant movement characteristics according to the acceleration signal from the acceleration measuring step;

an occupant movement characteristics determining step for determining whether or not the occupant movement characteristics exceed a predetermined movement characteristics determining threshold;

an acceleration change calculating step for calculating changes in the acceleration signal;

an acceleration change determining step for determining whether or not the changes in the acceleration signal exceed a predetermined acceleration determining threshold;

a frequency component analyzing step for decomposing a waveform of the acceleration signal into a frequency component;

a frequency component determining threshold setting step for setting a predetermined frequency component determining threshold for the frequency component according to results obtained in the occupant movement characteristics determining step and the acceleration change determining step;

a frequency component determining step for determining whether or not the frequency component exceeds the frequency component determining threshold; and a control signal generating step for generating a control signal for controlling an occupant-protecting apparatus according to results determined in the frequency component determining step.

12. A vehicle collision decision method according to claim 11 wherein:

a moving speed and a moving amount of the occupant are calculated in the occupant movement characteristics calculating step; and whether or not the moving speed of the occupant exceeds a predetermined moving speed determining threshold and whether or not the moving amount of the occupant exceeds a predetermined moving amount determining threshold are determined in the occupant movement characteristics determining step.

* * * * *

UNITED STATES PATENT AND TRADEMARK OFFICE
CERTIFICATE OF CORRECTION

PATENT NO.    : 6,816,767 B2
DATED         : November 9, 2004
INVENTOR(S)   : Masatoshi Hayasaka et al.

It is certified that error appears in the above-identified patent and that said Letters Patent is hereby corrected as shown below:

Column 3,
Line 3, change "the predetermined" to -- a predetermined --.
Line 18, change "apparatus having tile" to -- apparatus having the --.
Line 40, change "combine results of" to -- combine the results of --.

Column 5,
Line 9, change "whether of not" to -- whether or not --.
Line 34, change "riot the occupant-protecting" to -- not the occupant-protecting --.

Column 6,
Line 6, change "such an air bag device" to -- such as an air bag device --.

Column 7,
Line 58, change "(that is, 0 $23$ t $\leqq \infty$)" to -- (that is, $0 \leqq t \leqq \infty$) --.

Line 60 (Equation F1), change " $\int^{-n} G(t)dt$ " to -- $\int_{t}^{t-n} G(t)dt$ --.

Line 65, change "amount $\Delta Vx$" to -- amount $\Delta Sx$ --.

Column 8,
Line 5 (Equation F2), change " $\int^{-x}\int^{-x} G(t)dt^2$ " to -- $\int_{t}^{t-x}\int_{t}^{t-x} G(t)dt^2$ --.

Line 8, change "speed change $\square Vn$" to -- speed change $\Delta Vn$ --.
Line 9, change "moving amount $\Delta Vx$" to -- moving amount $\Delta Sx$ --.
Line 21, change "a difference $\square G$" to -- a difference $\Delta G$ --.
Line 22, change "0 < t < n and n< t < 2n" to -- $0 \leqq t \leqq n$ and $n \leqq t \leqq 2n$ --.

Line 27 (Equation F3), change " $\int^{-n} G(t)dt - \int_{-n}^{-2n} G(t)dt$ " to -- $\int_{t}^{t-n} G(t)dt - \int_{t-n}^{t-2n} G(t)dt$ --.

Column 9,
Line 29, change "$\square Sx$ for the occupant" to -- $\Delta Sx$ for the occupant --.

Column 10,
Line 18, change "at a threshold boarderline" to -- at a threshold borderline --.

Column 11,
Line 43, change "in the step 313" to -- in the step S13 --.
Line 57, change "amount S3 to 54" to -- amount S3 to S4 --.

UNITED STATES PATENT AND TRADEMARK OFFICE
CERTIFICATE OF CORRECTION

PATENT NO. : 6,816,767 B2
DATED : November 9, 2004
INVENTOR(S) : Masatoshi Hayasaka et al.

It is certified that error appears in the above-identified patent and that said Letters Patent is hereby corrected as shown below:

Column 12,
Line 53, change "in the case" to -- In the case --.
Line 64, change "apparatus according the" to -- apparatus according to the --.
Line 65, change "first embodiment in the present inventions" to -- first embodiment of the present invention --.

Column 13,
Line 5, change "ments as follows. Second Embodiment" to
-- ments as follows.
     Second Embodiment --.
Line 44, change "a acceleration sensor" to -- an acceleration sensor --.

Column 14,
Line 21, change "(step 524)" to -- (step S24) --.
Line 27, change "threshold VTH ($\Delta$Vx)" to -- threshold VTH ($\Delta$Sx) --.
Line 31, change "threshold VTH ($\Delta$Vx)" to -- threshold VTH ($\Delta$Sx) --.
Line 41, change "(step 523)" to -- (step S23) --.
Line 56, change "in the step 324" to -- in the step S24 --.

Column 15,
Line 5, change "is greater than" to -- is not less than --.
Line 40, change "in the step 332" to -- in the step S32 --.

Column 17,
Line 48, change "exceeds the acceleration" to -- is not less than the acceleration --.
Line 55, change "in the step 542" to -- in the step S42 --.

Column 18,
Line 4, change "VTH ($\Delta$Vx)" to -- VTH ($\Delta$Sx) --.
Line 8, change "VTH ($\Delta$Vx)" to -- VTH ($\Delta$Sx) --.

Column 20,
Line 16, change "VTH ($\Delta$SX)" to -- VTH ($\Delta$Sx) --.
Line 22, change "VTH ($\Delta$Vx)" to -- VTH ($\Delta$Sx) --.
Line 27, change "speed □Vn" to -- speed $\Delta$Vn --.
Line 35, change "in the stop 553" to -- in the step S53 --.

UNITED STATES PATENT AND TRADEMARK OFFICE
CERTIFICATE OF CORRECTION

PATENT NO. : 6,816,767 B2
DATED : November 9, 2004
INVENTOR(S) : Masatoshi Hayasaka et al.

It is certified that error appears in the above-identified patent and that said Letters Patent is hereby corrected as shown below:

Column 22,
Line 15, change "tion measuring device," to -- tion measuring device; --.

Signed and Sealed this

Twenty-sixth Day of July, 2005

JON W. DUDAS
*Director of the United States Patent and Trademark Office*